(12) United States Patent
Medina et al.

(10) Patent No.: US 9,137,366 B2
(45) Date of Patent: Sep. 15, 2015

(54) MAINTAINING A WORK SCHEDULE

(75) Inventors: Steven J. Medina, Omaha, NE (US);
Joseph S. Cox, Omaha, NE (US);
Kenneth A. Marr, Ashland, NE (US)

(73) Assignee: West Corporation, Omaha, NE (US)

( * ) Notice: Subject to any disclaimer, the term of this patent is extended or adjusted under 35 U.S.C. 154(b) by 1673 days.

(21) Appl. No.: 11/565,680

(22) Filed: Dec. 1, 2006

(65) Prior Publication Data
US 2008/0075268 A1    Mar. 27, 2008

Related U.S. Application Data

(63) Continuation-in-part of application No. 10/812,857, filed on Mar. 29, 2004.

(51) Int. Cl.
*H04M 3/00* (2006.01)
*H04M 3/51* (2006.01)
*H04M 3/523* (2006.01)

(52) U.S. Cl.
CPC .......... *H04M 3/5175* (2013.01); *H04M 3/5233* (2013.01); *H04M 2201/12* (2013.01); *H04M 2203/402* (2013.01)

(58) Field of Classification Search
CPC ..................... H04M 3/5175; G06Q 10/063116
USPC ............. 379/265.02, 265.06, 265.04, 265.05, 379/265.1, 265.12; 705/1, 9, 7.12, 7.13, 705/7.16, 7.22, 7.14, 7.15
See application file for complete search history.

(56) References Cited

U.S. PATENT DOCUMENTS

| | | |
|---|---|---|
| 3,883,970 A | 5/1975 | Campbell |
| 4,700,295 A | 10/1987 | Katsof et al. |
| 4,852,001 A | 7/1989 | Tsushima et al. |
| 5,053,970 A | 10/1991 | Kurihara et al. |
| 5,111,391 A | 5/1992 | Fields et al. |
| 5,124,912 A | 6/1992 | Hotaling et al. |
| 5,270,920 A | 12/1993 | Pearse et al. |
| 5,289,368 A | 2/1994 | Jordan et al. |
| 5,325,292 A | 6/1994 | Crockett |
| 5,467,268 A | 11/1995 | Sisley et al. |
| 5,499,291 A | 3/1996 | Kepley |
| 5,557,515 A | 9/1996 | Abbruzzese et al. |
| 5,615,121 A | 3/1997 | Babayev et al. |
| 5,617,342 A | 4/1997 | Elazouni |

(Continued)

OTHER PUBLICATIONS

University of Missouri Resources Policy Manual. "Shift Differential Compensation". Sep. 26, 1997. <http://umsystem.edu/ums/departments/hr/manual/213.shtml>.

(Continued)

*Primary Examiner* — Yosef K Laekemariam

(57) ABSTRACT

A system, method, and computer readable medium for maintaining a work schedule that comprises accepting a forecasted manpower requirement for zero or more agents, setting a recurring schedule for zero or more agents, summing the number of agents currently scheduled for an interval of time, determining a manpower availability based upon the summed current schedules, calculating a manpower delta between the forecasted manpower requirement and the determined manpower availability, offering an uptime adjustment to an agent not currently scheduled if the calculated manpower delta shows additional manpower is required, and offering a downtime adjustment to an agent currently scheduled if the calculated manpower delta shows less manpower is required.

21 Claims, 23 Drawing Sheets

(56) References Cited

U.S. PATENT DOCUMENTS

| | | | |
|---|---|---|---|
| 5,748,907 | A | 5/1998 | Crane |
| 5,842,182 | A | 11/1998 | Bonner et al. |
| 5,911,134 | A * | 6/1999 | Castonguay et al. ............ 705/9 |
| 5,960,406 | A | 9/1999 | Rasansky et al. |
| 6,044,355 | A | 3/2000 | Crockett et al. |
| 6,115,693 | A | 9/2000 | McDonough et al. |
| 6,192,346 | B1 | 2/2001 | Green |
| 6,249,715 | B1 | 6/2001 | Yuri et al. |
| 6,269,355 | B1 | 7/2001 | Grimse et al. |
| 6,278,978 | B1 | 8/2001 | Andre |
| 6,289,340 | B1 | 9/2001 | Puram et al. |
| 6,320,956 | B1 | 11/2001 | Cherry |
| 6,330,594 | B1 | 12/2001 | Swart |
| 6,334,133 | B1 | 12/2001 | Thompson et al. |
| 6,424,709 | B1 * | 7/2002 | Doyle et al. ............ 379/265.02 |
| 6,493,446 | B1 | 12/2002 | Cherry |
| 6,578,005 | B1 | 6/2003 | Lesaint et al. |
| 6,587,831 | B1 | 7/2003 | O'Brien |
| 6,823,315 | B1 | 11/2004 | Bucci et al. |
| 6,970,829 | B1 | 11/2005 | Leamon |
| 7,003,475 | B1 | 2/2006 | Friedland et al. |
| 7,023,979 | B1 | 4/2006 | Wu et al. |
| 7,218,974 | B2 | 5/2007 | Rumi et al. |
| 7,660,406 | B2 | 2/2010 | Fama et al. |
| 7,962,356 | B2 * | 6/2011 | Bollenbeck et al. ......... 705/7.13 |
| 8,219,430 | B1 * | 7/2012 | Thompson et al. ......... 705/7.12 |
| 2002/0065700 | A1 | 5/2002 | Powell et al. |
| 2002/0143601 | A1 | 10/2002 | Sinex |
| 2003/0236692 | A1 | 12/2003 | Hertel-Szabadi |
| 2004/0148178 | A1 * | 7/2004 | Brain, II ......................... 705/1 |
| 2005/0008140 | A1 * | 1/2005 | Bala et al. ................ 379/265.04 |
| 2005/0137925 | A1 | 6/2005 | Lakritz et al. |
| 2005/0222889 | A1 | 10/2005 | Lai et al. |
| 2006/0109975 | A1 * | 5/2006 | Judkins et al. ........... 379/265.02 |
| 2009/0083107 | A1 | 3/2009 | Chen-Ritzo et al. |

OTHER PUBLICATIONS

University Professional & Technical Employees Contract. "Article 35: Shift Differential". Jul. 12, 1997. <http://www.upte.org/tx/contract/art35shiftdif.html>.

RN, "Index of Employers (Hosptial Profiles) (Nursing Opportunities Supplement)". Jan. 1988.

"Security System Minimises Baggage". Feb. 2, 1995. Business Computing Brief.

University of California Human Resources and Benefits Department. "Personnel Policies for Staff Members". Jul. 1, 1996. <http://atyourservice.ucop.edu/employees/policies/staff_policies/spp33.html>.

University of Texas Health Science Center at Houston. "Shift Differential Pay". Nov. 1998. <http://www.uth.tmc.edu/ut_general/admin_fin/planning/pub/hoop/05/5_07.html>.

University of Houston Manual of Administrative Policies and Procedures. "Shift Differential Pay". Aug. 22, 1996. <http://www.uh.edu/mapp/02/020105pro.htm>.

Allimadi, Milton, "Workforce Management Systems Response to Challenges with more Sophisticated Products". Call Center Magazine. Apr. 1999. pp. 82-92.

Brown, Dartanyan L., "TeamAgenda Puts Groups on Schedule". MacWeek, v5, n40, p8 (10, Nov. 19, 1991).

Higgings, Steve, "MediaWorks Offers Mac Work-Group Program". PC Week, v8, n24, p85(1), Oct. 21, 1991.

Durr, Bill, "Inbound Scheduling Nightmares: Cursing the Darkness or Lighting a Candle". Telemarketing Magazine, v12, n7, pp. 44-48, Jan. 1994.

West Teleservices 1996 Annual Report, 1997, p. 5, United States.
West Teleservices 1997 Annual Report, 1998, p. 6, United States.
West Teleservices 1998 Annual Report, 1999, pp. 6-7, United States.
West Teleservices 1999 Annual Report, 2000, p. 3, United States.
Hunt, Brooks, "$99.95 Staff Scheduler With Smarts Covers Your Tasks". PC Magazine, v8, n9, pp. 54(1), May 16, 1989.

* cited by examiner

Forecast Before Dynamic Reallocation

92:

| | Skill A | Skill B |
|---|---|---|
| Agents Required | 100 | 1000 |
| A Only | 50 | |
| B Only | | 800 |
| A & B | | 140 |
| Total | | |
| % of Agents Req. | 50% | 94% |

Forecast After Dynamic Reallocation

94:

| | Skill A | Skill B |
|---|---|---|
| Agents Required | 100 | 1000 |
| A Only | 50 | |
| B Only | | 800 |
| A & B | 40 | 100 |
| Total | | |
| % of Agents Req. | 90% | 90% |

Figure 3

Initial Forecast

|  | Total | Skill A | Skill B | Skill C |
|---|---|---|---|---|
| A-Only | 100 | 100 | - | - |
| B-Only | 1000 | - | 1000 | - |
| C-Only | 500 | - | - | 500 |
| A-B | 50 | 50 | 0 | - |
| A-C | 50 | 50 | - | 0 |
| B-C | 100 | - | 50 | 50 |
| A-B-C | 200 | 100 | 100 | 0 |
| Total | 2000 | 300 | 1150 | 550 |
| Forecast | 2000 | 300 | 1150 | 550 |
| % Goal | 100 | 100 | 100 | 100 |
| +/- | 0 | 0 | 0 | 0 |

} 172

Updated Need for Agents with Skill B

|  | Total | Skill A | Skill B | Skill C |
|---|---|---|---|---|
| A-Only | 100 | 100 | - | - |
| B-Only | 1000 | - | 1000 | - |
| C-Only | 500 | - | - | 500 |
| A-B | 50 | 50 | 0 | - |
| A-C | 50 | 50 | - | 0 |
| B-C | 100 | - | 50 | 50 |
| A-B-C | 200 | 100 | 100 | 0 |
| Total | 2000 | 300 | 1150 | 550 |
| Forecast | 2300 | 300 | 1450 | 550 |
| % Goal | 87 | 100 | 79.3 | 100 |
| +/- | -300 | 0 | -300 | 0 |

} 174

Dynamic Reallocation Before Uptime Offers

|  | Total | Skill A | Skill B | Skill C |
|---|---|---|---|---|
| A-Only | 100 | 100 | - | - |
| B-Only | 1000 | - | 1000 | - |
| C-Only | 500 | - | - | 500 |
| A-B | 50 | 7 | 43 | - |
| A-C | 50 | 50 | - | 0 |
| B-C | 100 | - | 100 | 0 |
| A-B-C | 200 | 100 | 100 | 0 |
| Total | 2000 | 257 | 1243 | 500 |
| Forecast | 2300 | 300 | 1450 | 550 |
| % Goal | 87 | 85.7 | 85.7 | 90.9 |
| +/- | -300 | -43 | -207 | -50 |

Forecast After 43 A-Skill Agents Accept Uptime Offer

| | Total | Skill A | Skill B | Skill C |
|---|---|---|---|---|
| A-Only | 143 | 143 | - | - |
| B-Only | 1000 | - | 1000 | - |
| C-Only | 500 | - | - | 500 |
| A-B | 50 | 7 | 43 | - |
| A-C | 50 | 50 | - | 0 |
| B-C | 100 | - | 100 | 0 |
| A-B-C | 200 | 100 | 100 | 0 |
| Total | 2043 | 300 | 1243 | 500 |
| Forecast | 2300 | 300 | 1450 | 550 |
| % Goal | 88.8 | 100 | 85.7 | 90.9 |
| +/- | -257 | 0 | -207 | -50 |

182

Forecast After 43 A-Skill Only Agents Accept Uptime and Dynamic Reallocation

| | Total | Skill A | Skill B | Skill C |
|---|---|---|---|---|
| A-Only | 143 | 143 | - | - |
| B-Only | 1000 | - | 1000 | - |
| C-Only | 500 | - | - | 500 |
| A-B | 50 | 0 | 50 | - |
| A-C | 50 | 50 | - | 0 |
| B-C | 100 | - | 100 | 0 |
| A-B-C | 200 | 71 | 129 | 0 |
| Total | 2043 | 264 | 1279 | 500 |
| Forecast | 2300 | 300 | 1450 | 550 |
| % Goal | 88.8 | 88 | 88.2 | 90.9 |
| +/- | -257 | -36 | -171 | -50 |

184

Forecast After 157 A-Skill Only Agents Accept Uptime Offer and Dynamic Reallocation

| | Total | Skill A | Skill B | Skill C |
|---|---|---|---|---|
| A-Only | 300 | 300 | - | - |
| B-Only | 1000 | - | 1000 | - |
| C-Only | 500 | - | - | 500 |
| A-B | 50 | 0 | 50 | - |
| A-C | 50 | 0 | - | 50 |
| B-C | 100 | - | 100 | 0 |
| A-B-C | 200 | 0 | 200 | 0 |
| Total | 2200 | 300 | 1350 | 500 |
| Forecast | 2300 | 300 | 1450 | 550 |
| % Goal | 95.7 | 100 | 93.1 | 100 |
| +/- | -100 | 0 | -100 | 0 |

MAINTAINING A WORK SCHEDULE

CROSS REFERENCE TO RELATED APPLICATIONS

This application is a continuation-in-part of pending U.S. application Ser. No. 10/812,857, filed on 29 Mar. 2004, the contents of which are incorporated herein by this reference. The applicant claims the benefit of the filing dates of the above applications to the fullest extent permitted by 35 U.S.C. §120.

The present patent application is also related to commonly assigned U.S. patent application Ser. No. 10/877,964, filed on 25 Jun. 2004, entitled EMPLOYEE SCHEDULING AND SCHEDULE MODIFICATION METHOD AND APPARATUS, U.S. patent application Ser. No. 11/565,679, filed on 1 Dec. 2006, entitled DYNAMICALLY ALLOCATING A WORK SCHEDULE, U.S. patent application Ser. No. 11/565,677, filed on 1 Dec. 2006, entitled OFFERING UPTIME ADJUSTMENTS TO A WORK SCHEDULE, U.S. patent application Ser. No. 11/565,676, filed on 1 Dec. 2006, entitled PROPOSING DOWNTIME ADJUSTMENTS TO A WORK SCHEDULE and U.S. patent application Ser. No. 11/565,681, filed on 1 Dec. 2006, entitled EVENT BASED FORECASTING A WORK SCHEDULE, the entire contents of each of which are incorporated by reference herein.

BACKGROUND OF THE INVENTION

The present invention relates generally to employee management tools and in particular to a system configured to manage the work schedules of a plurality of employees.

Historically, management and scheduling of a large employee workforce has been a complex and time consuming task. With regard to scheduling large groups of employees, it is difficult to predict the number of employees required to adequately staff a particular shift. Once the number of required employees is determined, employees must each be assigned a work schedule. Scheduling employees can be a complex task as many different factors constrain which employees may be selected for a particular shift. For example, scheduling limitations exist regarding hours worked per week, hours worked per day, or other factors. Further, some employees are available to work only certain days and/or certain hours. In addition, employees may wish to take vacation time, or to schedule changes for other reasons. Further, certain shifts may unexpectedly require additional employees to meet unexpected increases in workload, or conversely, certain shifts may require fewer employees than previously anticipated.

Workforce Management (WFM) systems have been developed to assist businesses deal with the challenges of workforce scheduling, particularly in environments where the staffing requirements are variable. Call centers are an excellent example of such an environment. Being correctly staffed is essential to efficient operation of a call center, since too many employees will result in excess labor costs, and two few will results in lost opportunity and/or poor customer service.

The current state of the art for WFM Systems consists of two steps, forecasting how many people will be required for each period of time, and then generating the schedules of the workforce to best meet the forecasted requirements. This results in new schedules for the employees with each new forecast. In order to make the scheduling process friendlier to the employees many systems will allow the manual entry of employee preferences and limitations.

A major deficiency in the current state of the art for WFM systems is that the forecasting/scheduling tasks must be accomplished in enough time to notify the workforce of the required schedules. If the employees schedule will not be fixed, but will be determined by the scheduling system for each period scheduled, you must, as a practical matter, inform people of the schedules they will be expected to work far enough in advance so that they will be available to work their scheduled shifts. This necessitates considerable lead time in the creation of a forecast. Often the schedule is created before all information that would be useful for forecasting is available. Also, any significant change to the forecasting criteria which results in changes to the forecast forces upon management the difficult choice of regenerating schedules for the employees or just trying to adjust the workforce outside of the WFM system.

Another major deficiency with the current state of the art for WFM Systems is that there is often resistance on the part of the employees to work shifts that are (from the employees perspective) arbitrarily assigned by the WFM System. Features like employee preferences, shift bids, and the ability to lock down some of the schedules are attempts to mitigate this problem; however they are not adequate solutions to the problem because loaded information is static and lives are dynamic. The system cannot forecast people's actual preferences because they change from day to day.

State of the art Automatic Call Distribution (ACD) systems are quite sophisticated in how they allow calls to be routed to a population of call center agents. One of the challenges in routing calls to agents is how to achieve economies of scale when call volumes are low. An effective way to address this problem is to employ multi-skilled agents. A pool of agents who are known to the ACD as being able to handle multiple skills, call types, can greatly increase the efficiency of all the agents working the skills. Multi-Skilled (MS) Agents have beneficial impact to the efficiency of agents in a call center that is disproportionate to their numbers in the population.

While the benefits provided by the employment of MS Agents are well established, and the ACD systems provide excellent support for their use, the current state of the art of WFM systems is not up to the task of dealing with the challenges presented by the MS Agent. Most systems make no attempt to deal with MS Agents beyond simply noting that a person scheduled to skill A will also be working skill B.

The real challenge presented by the MS Agents is that the number of agents required is driven by the total number of calls that will be received and must therefore be determined independently for each skill. However the number of agents scheduled is calculated by the particular combination of skills that each agent is working. One agent working three skills is not the equivalent of three agents each works one skill. This makes calculating how many agents are scheduled to work any given skill difficult to calculate when you have MS Agents. Most WFM systems calculate all agents as single skilled for scheduling purposes.

Several attempts have been made to overcome these types of problems however, these attempts do not fully overcome the disadvantages of the prior art. For example, U.S. Pat. No. 5,499,291, issued to Kepley, describes a scheduling system that communicates an agents schedule directly to the agent at the agent's terminal, thereby preventing the need for manual distribution. The schedule is presented to the agents via video displays that are at each agents actual work station, and thus are available for viewing by a particular agent only when that agent is seated at his or her workstation. Furthermore, the Kepley reference does not provide means to account for schedule changes. Absent these features, a system based on the teachings of Kepley still suffers from many of the disadvantages of the prior art.

Likewise, U.S. Pat. No. 5,289,368, issued to Jordan et al, and U.S. Pat. No. 5,325,292, issued to Crockett, both of which share a common specification, describe systems and methods used to help schedule employee work shifts. However, the methods and apparatus of these systems still possess several disadvantages of the prior art. Among others, system configured according to the teachings of these references still lack an ability to schedule based on employee and not shift, lack an ability to provide the schedules on an employee distributed basis and lack the ability to conveniently and easily deal with schedule changes.

Therefore, what is needed is a new method, apparatus and computer readable medium for maintaining a work schedule. More specifically, what is needed is a method that grants the agent a greater degree of control over their work schedule while at the same time meeting the staffing needs of the enterprise. As described below, the present invention overcomes the disadvantages of the prior art by providing a new method and apparatus for maintaining a work schedule.

SUMMARY OF THE INVENTION

In accordance with the purpose of the invention as broadly described herein there is provided an agent scheduling system for use in a work environment wherein the agent scheduling system facilitates the storage, distribution, and modification of agent schedules.

The present invention WFM system (called Spectrum) departs from traditional WFM Systems because it does not dictate schedules to agents, it offers options for uptime and downtime in accordance with the enterprise's forecasted needs. The present invention provides each agent a fixed weekly schedule, called the recurring schedule, and additionally provides uptime and downtime adjustments offers based on the agent's skill set and the forecasted skills needed. Thus the agent has a set schedule and which he or she has the option to modify in a fashion which optimally meets forecasted manpower requirements. If the WFM system forecasts a manpower overage for the agent's skill, then the agent will be offered downtime a adjustment, if the WFM system forecasts manpower shortfalls, the agent will be offered uptime adjustments. In this way, the needs of the company for optimal manpower efficiency and the needs of the agent for flexibility are both simultaneously addressed.

The dual schedule concept is unique to the present invention. The current state of the art for WFM systems do not utilize a recurring schedule due to the fact that new schedules are created for the agents each time a forecast is created.

In one embodiment, a scheduling computer executes the scheduling software to achieve the functions of the present invention. The computer and software running thereon accept input from management including but not limited to agent files, workload data, and schedules. Also included in various embodiments of the scheduling system are one or more display monitors located remotely from the scheduling computer, one or more work stations or kiosks located remotely from the scheduling computer and a remote access module configured to facilitate access to the scheduling data via computer network.

With regard to embodiments configured with a remote access interface or portal, the scheduling computer may communicate with the remote access interface to facilitate the exchange of data over a network, such as the Internet. This feature advantageously allows a remotely located employee to utilize the features of the scheduling system. In another embodiment, the remote access module is configured to facilitate a connection between one or more remote offices.

In various embodiments, the system may include the ability to transmit a request to the agents over one or more access points, such as kiosks or display monitors, requesting additional or fewer agents on a particular shift. In response, the agents may optionally respond to the request at certain access points capable of receiving input, such as a kiosk.

In one embodiment of the present invention, a method for maintaining a work schedule wherein a manpower requirement is forecasted for zero or more agents, that comprises accepting a forecasted manpower requirement for zero or more agents, setting a recurring schedule for zero or more agents, summing the number of agents currently scheduled for an interval of time, determining a manpower availability based upon the summed current schedules, calculating a manpower delta between the forecasted manpower requirement and the determined manpower availability, offering an uptime adjustment to an agent not currently scheduled if the calculated manpower delta shows additional manpower is required, and offering a downtime adjustment to an agent currently scheduled if the calculated manpower delta shows less manpower is required. Wherein the forecasting of the manpower requirement may be for at least one of one skill, and two or more skills, the determination of manpower availability is based upon the scheduled skills, the calculation of manpower delta is based upon the scheduled skills, the offer of an uptime adjustment is based upon the trained skills, the offer of a downtime adjustment is based upon the scheduled skills. The method may comprise assessing a scheduled skill and a trained skill of zero or more agents, wherein the setting of recurring schedules of each agent is based upon current scheduled skills, accepting the offered uptime adjustment by at least one agent, modifying the work schedule based upon the accepted uptime adjustment, accepting the downtime adjustment by at least one agent, adjusting the work schedule based upon the accepted downtime adjustment, recalculating at a pre-determined interval, or on demand, the manpower delta between the forecasted manpower requirement and the determined manpower availability. The method may additionally comprise summing the current schedules of agents who are scheduled to work multiple skills concurrently by a combination of skills to which they are scheduled, allocating a scheduled skill combination count to a component skill and determining a manpower availability based upon the summed current schedules based upon an allocated skill.

In a further embodiment of the present invention, a computer readable medium that comprises instructions that comprises, assessing a trained skill and a scheduled skill of zero or more agents, setting a recurring schedule of zero or more agents based upon the trained skills, summing a current schedule of all agents for an interval of time based upon the scheduled skills, determining a manpower availability based upon the summed current schedules based upon the scheduled skills, calculating a manpower delta between a forecasted manpower requirement by skill and the determined manpower availability based upon the scheduled skills, establishing a fill target for the calculated manpower delta below which additional manpower is required based upon the scheduled skills, and establishing a dump target for the calculated manpower delta above which less manpower is required based upon the scheduled skills. The computer readable medium may comprise offering an uptime adjustment of a work schedule to an agent who is currently not scheduled if the calculated manpower delta is below an affixed fill target based upon the trained skills, offering a downtime adjustment of the work schedule to an agent who is currently scheduled if the calculated manpower delta is above the established dump target based upon the scheduled skills, accepting the offered uptime adjustment by at least one agent, modifying the work schedule based upon the accepted uptime adjustment, accepting the offered downtime adjustment by at least one agent, adjusting the work schedule based upon the accepted downtime adjustment, summing the current schedules of agents who are scheduled to work multiple skills concurrently by a combination of skills to which they are scheduled, allocating a scheduled skill combination count to a component skill, and determining a manpower availability based upon the summed current schedules based upon allocated skills.

In yet a further embodiment, a system for maintaining a work schedule, that comprises, a memory that receives at least one manpower forecast requirement, a skill assessment for zero or more agents, and zero or more work schedules for an interval of time, and a processor communicably coupled to the memory, wherein the processor, sets a recurring schedule of zero or more agents, sums a current schedule of the zero or more agents for the interval of time, determines a manpower availability based upon the summed current schedules, and calculates a manpower delta between the forecasted manpower requirement and the determined manpower availability. The system processor may assesses a trained skill and a scheduled skill of the at least one agent, sum the current schedules by a skill combination, allocate a skill combination count across the skills, and determine a manpower availability based upon the allocated skills.

BRIEF DESCRIPTION OF THE DRAWINGS

FIG. 3 depicts an exemplary dynamic allocation;

FIG. 6 depicts an exemplary dynamic allocation;

FIG. 7 depicts an exemplary dynamic allocation;

DETAILED DESCRIPTION OF THE INVENTION

The present invention provides improved systems and methods for staffing, scheduling, and managing a plurality of agents. In one embodiment, the system includes at least one computer configured with software to receive work force requirement data and create schedules based on the work force requirement data using any of many various scheduling algorithms. Hence, based on input regarding previous work force requirements or anticipated work force requirements, the scheduling system creates work force requirements and offers uptime and downtime adjustments to satisfy those requirements.

Figure 1:
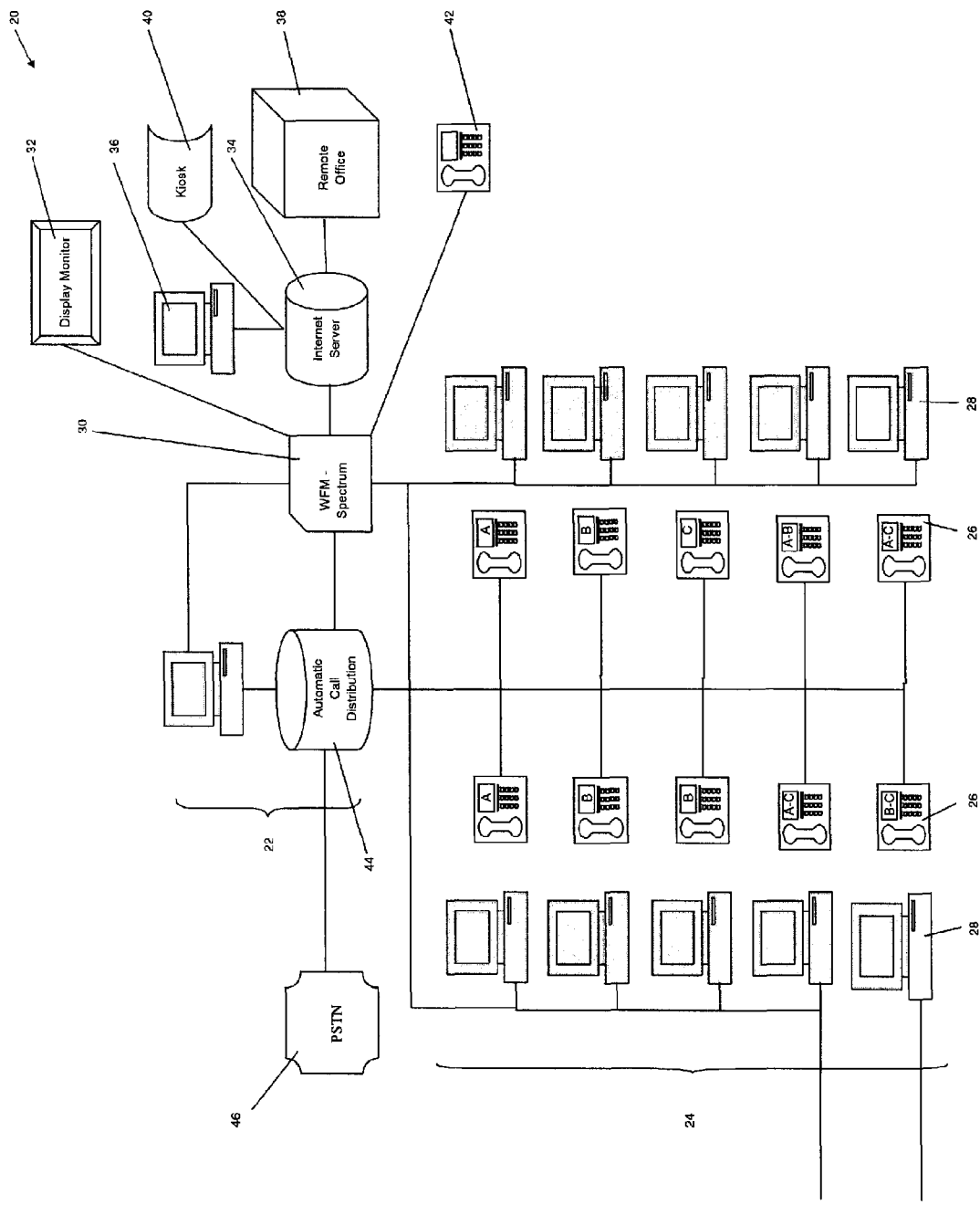
FIG. 1 depicts a block diagram of an example environment of the present invention in accordance with a preferred embodiment of the present invention.

Although other applications are possible, one example environment 20 in which the subject invention can be implemented is shown in FIG. 1. As shown, one example environment comprises a large office building or office complex having management offices 22 and an agent work area 24. In this example environment the agent work area comprises the floor of a telephone services operation 26, such as for receiving or placing telephone sales calls. The work area includes rows of stations, each station having a terminal 28.

For purposes of the present application, the term agent refers to the individuals for whom schedules are created, maintained, and monitored. For purposes of the present application term skill refers to the capability to process or complete a unit of work for which an agent has been trained or is known to have. Forecasted manpower requirements are calculated by skill. For purposes of the present application the term 'skill combo' referrers to the one or more skills to which an agent is scheduled to for a given interval of time.

Within the management office is a computer server 30 configured to execute software written to achieve the function of the present invention. The server 30 and software running thereon accept input from management including but not limited to agent files, workload data, and schedule changes. The server 30 communicates agent schedule data to one or more monitors 32 for display to agents. In one configuration, the monitors are large overhead-mounted video display monitors able to simultaneously visually communicate the schedule data to a plurality of agents.

In the example environment shown in FIG. 1, one or more computer workstations 28 reside throughout the agent work area. Each workstation provides means for the agents to access and/or print their work schedules. For example, the workstation may be accessed by a computer with external wireless capability (such as the wireless card) or internal wireless capability (such as 802.11 or any of the other 802 variants). The communications occurs via at least one of the wireless protocol, the wired protocol and the combination of the wireless protocol and the wired protocol.

Included in this example environment is an Internet server 34 that connects to the Internet or other computer network. The Internet server facilitates connection to the scheduling system by one or more agents or entities at one or more remote locations 36. The transfer of information between the agent and the present invention WFM system occurs via at least one of a wireless protocol, a wired protocol and the combination of the wireless protocol and the wired protocol. The steps performed in this figure are performed by software, hardware, firmware, and/or the combination of software, hardware, and/or firmware.

For example, in this environment, agents located outside their work environment may connect to the scheduling system over the Internet to ascertain their work schedule or utilize other functions of the scheduling system of the present invention.

In the example environment shown here, the present invention also facilitates a connection to one or more remote offices 38. In the example environment shown, the remote office comprises another telephone services call center that may be located in another city. The transfer of information occurs via at least one of a wireless protocol, a wired protocol and the combination of the wireless protocol and the wired protocol. The steps performed in this figure are performed by software, hardware, firmware, and/or the combination of software, hardware, and/or firmware.

Within this example environment of a telephone services call center, the system allows for access to the data via a number of access points, including but not limited to a user's computer terminal, centrally located user-interactive kiosks 40, large display monitors 32, Internet, or electronic mail. The transfer of information between the kiosk and the customer premises occurs via at least one of a wireless protocol, a wired protocol and the combination of the wireless protocol and the wired protocol. The steps performed in this figure are performed by software, hardware, firmware, and/or the combination of software, hardware, and/or firmware.

As the present invention is discussed herein in the environment of a call processing system, an automatic call distributor 44 connects intermediate the main computer 30 and the Public Switched Telephone Network (PSTN) 46. The automatic call distributor 44 accepts calls, such as calls from customers requesting to purchase an advertised product, via the PSTN 46. Upon receipt of a call, the automatic call distributor 44 may direct the call through the main computer to a call processing system. The call processing apparatus provides means for an agent to service the call, such as by taking the telephone order.

In this illustrative embodiment, the present invention works in conjunction with the automatic call distributor and call processing system. The present invention, while operating in conjunction with these systems, is generally independent from the call processing apparatus and automatic call distributor, and is described in this example environment only for purposes of understanding.

Figure 20:
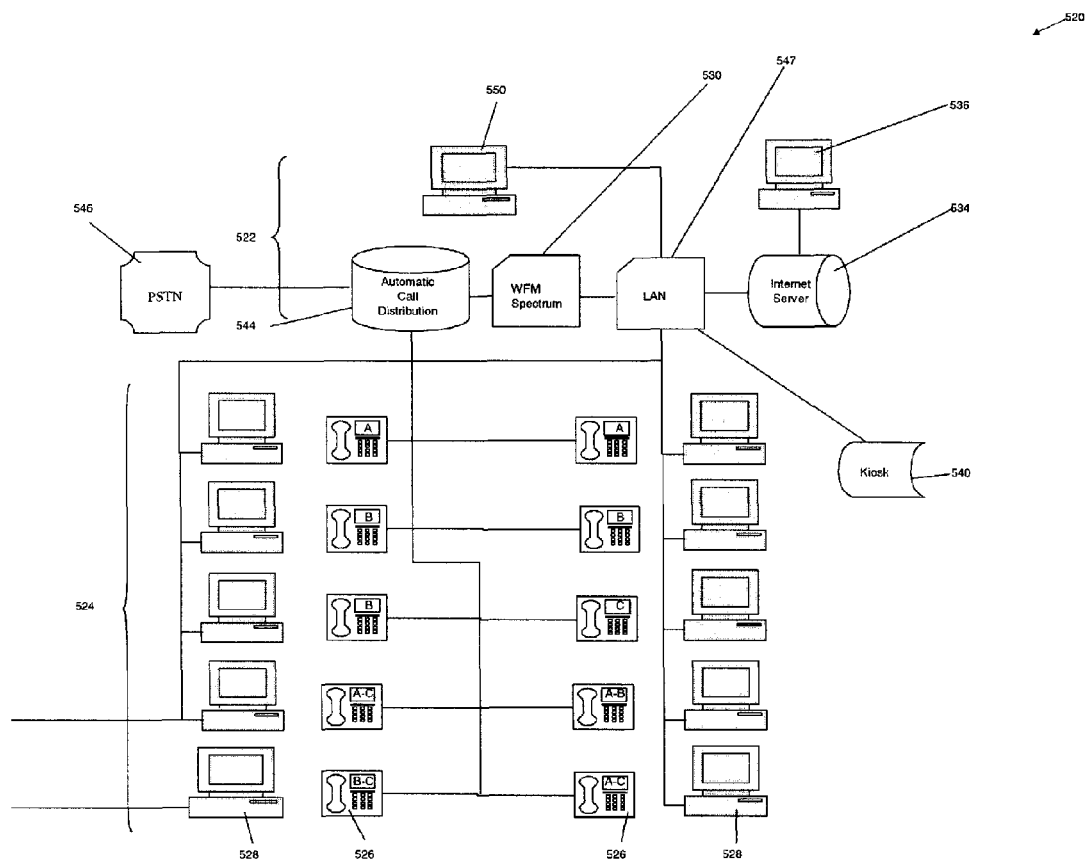
FIG. 20 depicts a block diagram of a second example environment of the present invention in accordance with a preferred embodiment of the present invention.

Another example environment 520 in which the subject invention can be implemented is shown in FIG. 20. As shown, one example environment comprises a large office building or office complex having management offices 522 and an agent work area 524. In this example environment the agent work area comprises the floor of a telephone services operation 526, such as for receiving or placing telephone sales calls. The work area includes rows of stations, each station having a terminal 528.

Within the management office is a computer server 530 configured to execute software written to achieve the function of the present invention. The server 530 and software running thereon accept input from management including but not limited to agent files, workload data, and schedule changes. The server 530 is connected to a local area network (LAN)

In the example environment shown in FIG. 20, one or more computer workstations 528, and one or more agent kiosks 540 reside in agent work area. Each workstation and kiosk provides means for the agents to access and/or print their work schedules. The workstations provide this functionality in addition to allowing the agent to perform their other work duties. The kiosk may be dedicated to supporting scheduling functionality. For example, it may be desired to limit the agents while at the workstation to work functions and so schedule changes would only be performed at the kiosk, or it may be desired to have all schedule functions performed on the workstations and the kiosks would not be needed.

Included in this example environment is an Internet server 534 that connects to the LAN and is a gateway to the Internet or some other computer network. The Internet server facilitates connection to the scheduling system by one or more agents or entities at any location that has access to the Internet.

For example, in this environment, agents located outside their work environment may connect to the scheduling system over the Internet to ascertain their work schedule or utilize other functions of the scheduling system of the present invention.

Within this example environment of a telephone services call center, the system allows for access to the data via a number of access points, including but not limited to a user's computer terminal, any user connected to the LAN 550, centrally located user-interactive kiosks 540, users connected to the Internet 536, and agent workstations 548. The transfer of information between the kiosk and the customer premises occurs via at least one of a wireless protocol, a wired protocol and the combination of the wireless protocol and the wired protocol. The steps performed in this figure are performed by software, hardware, firmware, and/or the combination of software, hardware, and/or firmware.

As the present invention is discussed herein in the environment of a call processing system, an automatic call distributor 544 connects to the scheduling system, possibly via an automated interface, and to the Public Switched Telephone Network (PSTN) 546. The automatic call distributor 544 accepts calls, such as calls from customers requesting to purchase an advertised product, via the PSTN 546.

In this illustrative embodiment, the present invention works in conjunction with the automatic call distributor and call processing system. The present invention, while operating in conjunction with these systems, is generally independent from the call processing apparatus and automatic call distributor, but may have interfaces for the purposes of capturing call statistics and other historical data that is useful in the forecasting & scheduling process. These interfaces also may support displays that will real time comparisons between the scheduled activity and actual activity. The present invention, while operating in conjunction with these systems, is generally independent from the call processing apparatus and automatic call distributor, and is described in this example environment only for purposes of understanding.

The present invention thus comprises an agent scheduling apparatus configured to execute software configured to achieve the functionality of the present invention. The software is described below in greater detail. In one embodiment, the agent scheduling apparatus comprises a computer capable of interfacing with the main frame and executing software. One such computer can be based on a processor running an operating system. It is contemplated that the agent scheduling apparatus includes at least one data entry device and at least one display device.

The agent scheduling apparatus utilizes the main computer to access one or more database storage devices, such as, by way of example and not limitation, hard disk drives, read/write optical storage, tape drives, and the like. As described below in greater detail, one configuration of the software utilizes the storage device to store employee data, schedule data, and call statistic data.

Although the present invention is described above in an example embodiment of a telephone service call center, it is anticipated that the present invention may be utilized any of a number of different environments where it is desirable to manage two or more agents.

Figure 2:
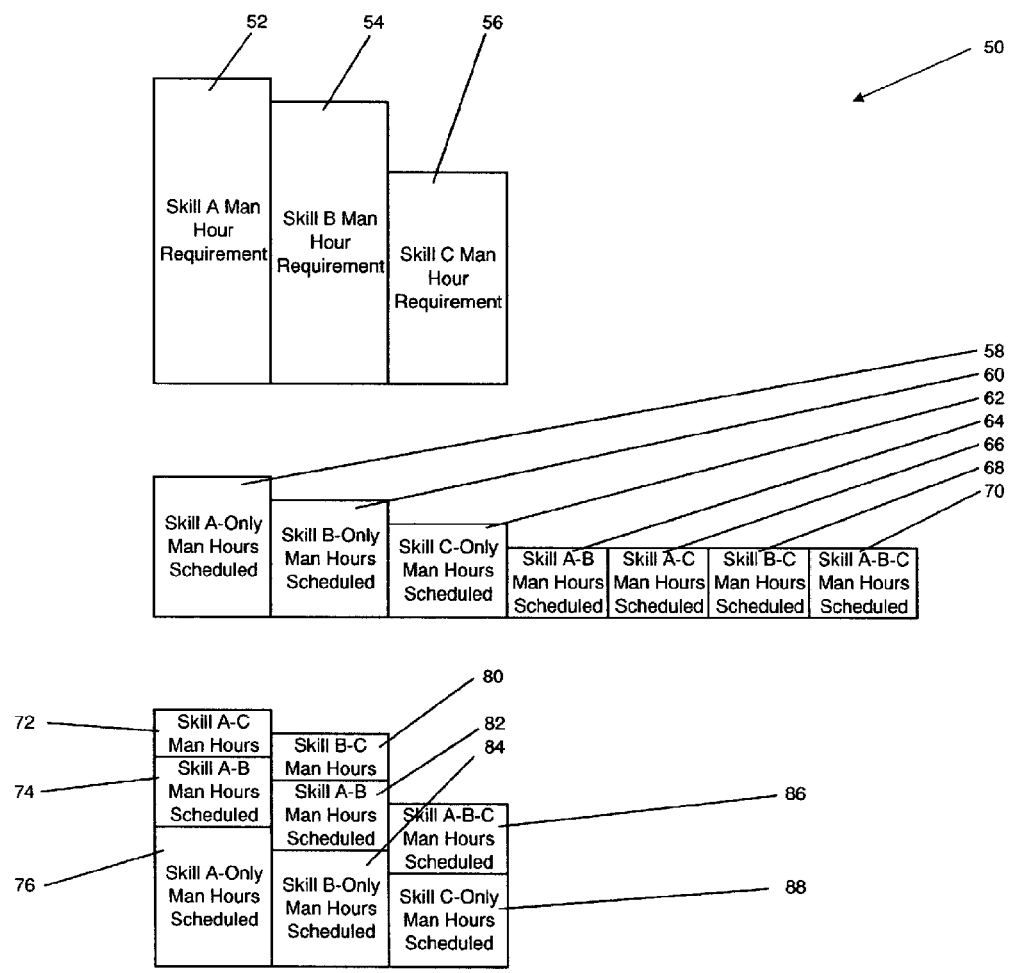
FIG. 2 depicts an exemplary manpower requirement by skill.

FIG. 2 illustrates how the present invention schedules 50 man hour skills to meet man hour skill requirements. Man hour requirements are forecasted, such as skill A 52, skill B 54 and skill C 56, based on well established principles utilizing past information, weighted averages and linear regression. The present invention utilizes in a more comprehensive way the information available as to skill assessment, whether it is single skill only 58, 60, 62, or multiple skill 64, 66, 68, 70. In the present example the single skilled agents are placed in those skill requirement positions 76, 84, 88, and the multiple skilled agents 72, 74, 80, 82, and 86 are scheduled such that the skill man hour requirements are most evenly met by reallocating multiple skilled agents to where they are needed. The use of this multiple skill information allows much more flexibility of workforce reallocation to meet schedule requirements.

FIG. 3 illustrates an example of how the present invention 90 allocates scheduled agents to determine skill staffing requirements. For example, Let us assume that there are two Skills, Skill A & Skill B. For a given interval the forecast indicates that 100 agents are required to work Skill A, and 1000 agents are required to work skill B. Let us assume we have only 50 agents who are dedicated to work skill A only, and we have 800 agents who are available to work skill B. We have 140 agents who are scheduled to work the skill combo of A & B. If the agents possessing both skill A and skill B are allocated to skill B, the number of agents allocated to A would be 50% of the required agents (the need) and the number of agents allocated to B would be 94% of the requirement, 92. The present invention would allocate 40 of these agents to Skill A and 100 of these agents to Skill B which results in both skills having 90% of the required number of agents allocated to them, 94. The allocation process does not result in any actual change to any agent's schedule, nor are individual agents allocated. The purpose of allocation is simply to determine the difference between the number of agents currently scheduled and the number of agents required. Allocation is not static. Anytime a forecast is modified or an agent's schedule is modified the allocation may become sub-optimal. The present invention will dynamically reallocate agents as changes are made to either schedules or forecasts. The frequency of the reallocation varies upon a number of factors, but reallocation for a given interval will normally occur several times an hour.

The system allows the user to define the combination of skills that may be worked concurrently by a user as a skill combo. Not all skills may be worked concurrently, for many reasons. The users may only be assigned to work valid skill combos that are based upon the actual routing rules for the calls delivered via the ACD. A single skill may be used in any number of Skill Combos. Multi-skilled Agents are scheduled to skill combos. When scheduled to multiple skills the system assumes no preference or priority. It is understood that the agent may be taking calls for any of the skills in the Skill Combo during the interval scheduled. When calculating how many of agents who are currently scheduled will be available to work a skill, the present invention will allocate the counts multi-skilled agents to one or more of the skills in the skill combo, based upon the percentage of the total number of agents required for each skill.

Figure 4:
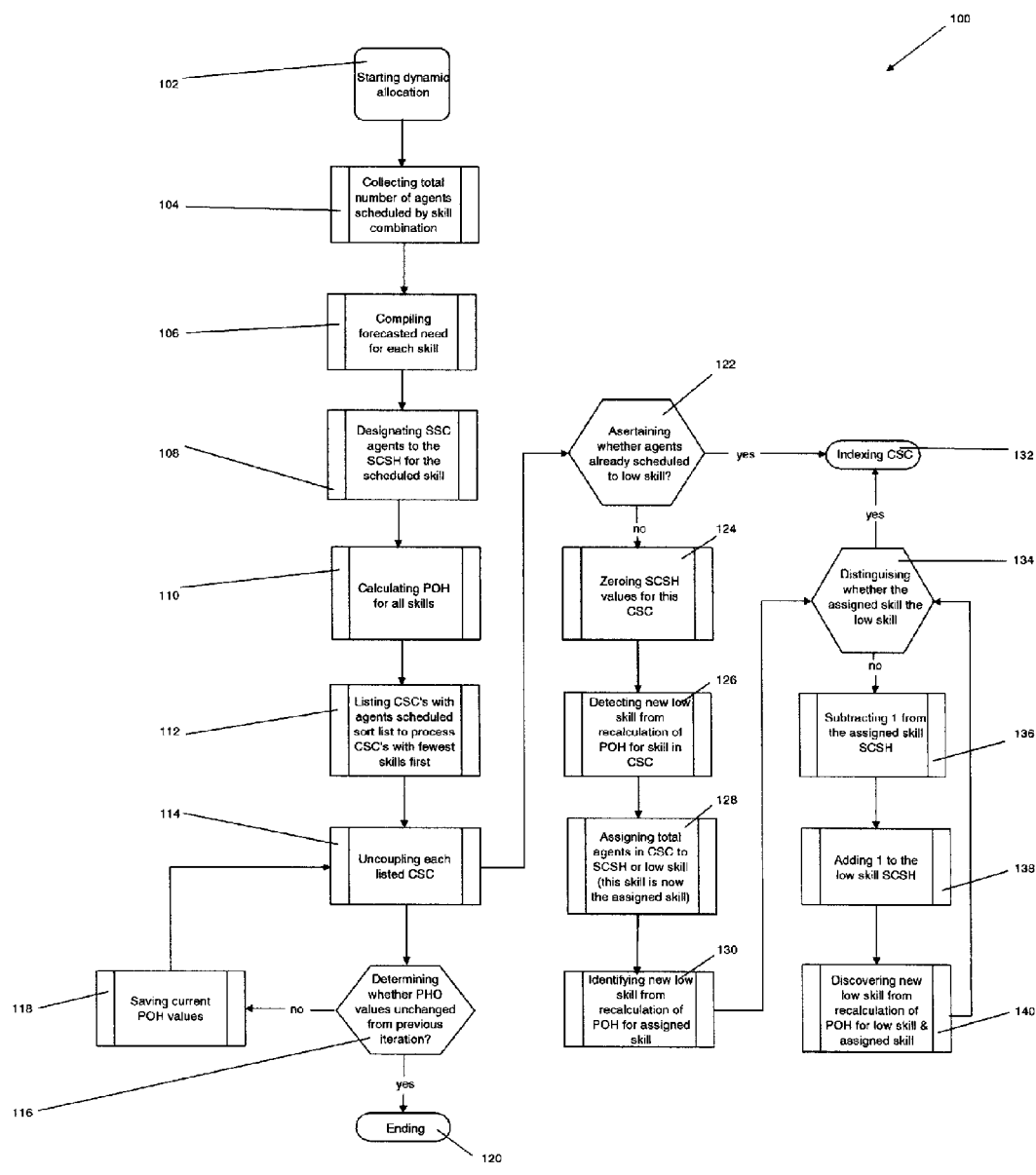
FIG. 4 depicts an exemplary block diagram of dynamic allocation.

Referring now to FIG. 4, the following terms are used as follows: a skill combination represents the one or more skills to which an agent is scheduled to work, a simple skill combination (SSC) consists of a single skill, a complex skill combination (CSC) will contain two or more skills, the Total Have for a skill is the total of all agents scheduled to work the skill and allocated to the skill. The percentage of have (POH) is calculated by dividing the Total Have for the skill by the total number of agents required according to the forecast. The Skill Combination Skill Have is the count of agents for a given skill combination who are allocated to the skill. For example, if we have 100 agents who are scheduled to work the CSC of Skill A/Skill B and we have allocated 30 of the agents to Skill A, and the remaining 70 agents are allocated to Skill B, then the first SCSH of A/B-A would be 30 and the second SCSH of A/B-B would be 70. The total of all SCSH values for a skill combination would equal the total number of agents scheduled to the skill combination. The total of all SCSH values for a skill would equal the Total Have for the skill. The allocation process is an iterative process of looping through each CSC and redistributing the count of scheduled agents for each CSC to each of the skills in the combo so as to allocate as evenly as possible, by percentage of the required agents, across all skills. The 'low skill' is the skill in a CSC that currently has the lowest POH value.

Referring again to FIG. 4, a first software flow diagram 100 of dynamic reallocation is depicted. The computer readable medium comprises collecting 104 the total number of agent scheduled by skill combination, aggregating 106 the forecasted need for each skill, allocating 108 all SSC agents to the SCSH list for the scheduled skill, calculating 110 the POH for each skill, saving 116 the current POH values, building 112 a skill list for all of the CSC agents scheduled, sorting the list to process the complex skill combination agents with the fewest skills first, uncoupling 114 each complex skill combination in the skill list ascertaining 122 whether all complex skill combination agents are already allocated to the low skill. If all complex skill combination agents are not allocated to the low skill, zeroing 124 the SCSH values for this CSC, detecting 126 the new low skill, allocating 128 total agents scheduled to the CSC to the SCSH of the low skill and recalculating 130 the percentage of have to determine the new low skill. While the assigned skill is not the low skill 134, subtracting one 136 from the assigned skill, adding one 138 to the low skill, recalculating the POH and determining 140 the new low skill will continue. The process then continues to the next CSC 132. Determining 116 if the POH has not changed from the previous iteration, which indicates that optimization has been achieved.

A sheet is a manager-created option requesting that agents make voluntary schedule changes based on future anticipated workload. Once created, a sheet is posted in this example electronically, thereby allowing agents to sign-up for the specified schedule changes. For example, if it is determined that additional agents are required, often because the workload level has changed, then a sheet may be created to allow agents to accept uptime. In one example configuration, the sheet includes information regarding the shift that the sheet is directed to, whether additional workers or fewer workers are needed, how many more or fewer workers are required, and text entry areas for workers to sign-up for the sheet. Thus, a sheet may be used to add to the number of workers scheduled for a shift or to reduce the number of workers scheduled for a shift.

Figure 5:
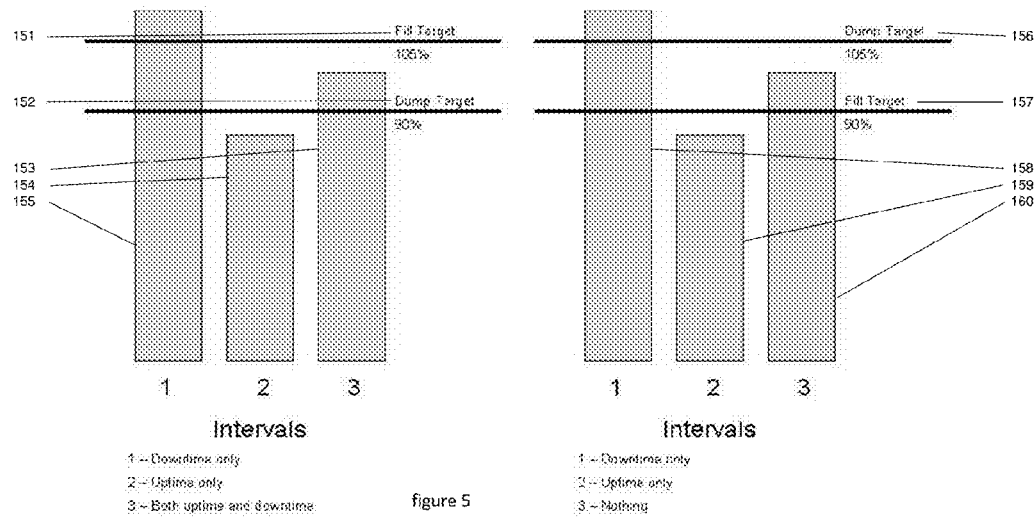
FIG. 5 depicts an exemplary dump and fill target for forecasting.

In another configuration of the invention the user does not specify a specific number of agents to add or drop, but will instead define a goal for the number of agents to schedule as a percentage of the forecasted requirements. This configuration allows the system to automatically react to changes in the forecast by offering uptime or downtime as required. The second configuration is described in FIG. 5. Referring now to FIG. 5, an overview of the use of percentage targets to control staffing 150, there are two examples of setting targets. In the first example we have a fill target 151 of 105 percent and a dump target 152 of 90%. As long as the number of agents allocated to the skill is above the dump target 152 the system will offer downtime and as long as the number of agents allocated to the skill is below the fill target 151 the system will offer uptime. We see that for the first interval 155 the system is only offering downtime because we are above the fill target, and above the dump target. For the second interval 154 we are only offering uptime because we are below the fill target and also below the dump target. For the third interval 153 the system is offering both uptime to agents who are not scheduled and downtime to agents who are scheduled because we are both above the dump target 152 and below the fill target 151. In the second example the fill target 157 is set to 90% and the dump target 156 is set to 105%. As in the first example we are offering downtime for the first interval 158 and uptime for the second interval 159. However, for the third interval 160 the system is offering neither uptime nor downtime because we are above the fill target 157 and below the dump target 105.

As long as the number of agents allocated to work the skill is less than the fill percentage target the system will offer Uptime adjustments to qualified agents. As long as the number of agents allocated to work the skill is greater than the dump percentage target the system will offer Downtime adjustments to qualified agents. For example, the user may create an Automatic Sheet for Skill A for a given week. The fill target is set to 95% and the dump target is set to 105%. If the number of agents required to work one of the intervals is 1000 then the present invention will offer uptime as long as the number of agents allocated to Skill A is below 950 and will offer downtime as long as the number of agents allocated to Skill A is above 1050. The dump and fill targets are both based upon the forecasted number of agents required, but they operate independently. In the example above there is a gap between 95% and 105% where the present invention would offer neither uptime nor downtime adjustments; however the targets could be reversed so that uptime would be offered while we are below 105% and downtime could be offered while we are above 95%. In this case when the number of scheduled agents is between 95% and 105% the present invention would offer both uptime adjustments and downtime adjustments. Any agent who wishes to do so may access the system via the web or a kiosk and modify their schedule.

Agents who wish to work extra hours will have displayed to them any uptime adjustments that they are eligible to accept. If the agent accepts the adjustment, the system will automatically modify their schedule to work the intervals accepted. Agents who wish to work fewer hours will have displayed to them any downtime adjustments that they are eligible to accept for intervals to which they are currently scheduled. If the agent accepts the adjustment, the system will automatically modify their schedule to no longer work the intervals accepted. MS Agents may be offered uptime adjustments that are multi-skilled. The system automatically converts the offer generated by an Automatic Sheet for a skill into an uptime adjustment for a Skill Combo based upon the skills that the agent is qualified to work. If any skill in a Skill Combo is offering uptime, the uptime adjustment will be offered; however, downtime is only offered if all of the skills in the Skill Combo are currently offering downtime.

Referring now to FIG. 6, an overview of dynamic allocation and automatic sheets 170 is shown. One of the features of the invention is the way that Dynamic Allocation works in conjunction with Automatic Sheets. In the initial forecast 172 we have three skills, A, B & C. We have agents scheduled to 7 different Skill Combos, including three dedicated combos (one skill only) and four that have more than one skill. The total number of agents scheduled is 2000, and the total number of agents required by the forecast is 2000. Through allocation, every skill is currently scheduled to exactly 100% of the goal, and the number of agents over or under the forecast (the +/−) for each skill is zero. If a user were to modify the forecast for Skill B due to additional information the situation would look like 174. The forecast for Skill B was modified from 1150 to 1450. This drops skill B to 79.3 percent of the forecast goal. Our delta to the forecast is now −300. However, the present invention would automatically reallocate based upon the change to the forecast and after reallocation the dynamic allocation would 176. The reallocation results in all of the B-C agents being reallocated from C to B, and some of the A-B agents being reallocated from A to B. A now has a delta of −43 and B has a delta of −207, however notice that both are at 85.7% of the forecasted goal. Skill C is higher, at 90.9% of the forecasted goal, but notice that we do not have anyone else that can be moved from C, since all 500 remaining agents are dedicated C-Only agents. We are now offering uptime for all three skills.

Referring now to FIG. 7, an overview of dynamic allocation and automatic sheets 180 is shown. Lets assume that 43 A-Only agents accept uptime so that A is now back at 100% as shown in 182. If the system were static, we would now be at 100% for A and would stop offering uptime for agents who work that skill. But we never reach this point since all the while we are signing up the 43 new single skilled agents the system is reallocating the multi-skilled agents. After the 43 agents have signed up we actually look like FIG. 184. Assume that we continue to get only agents that can work skill A to sign-up for our uptime shift adjustments. Eventually we would get to 186. At this point we no longer offer uptime for Skill A, since we are at 100% of forecast, and we have no more multi-skilled agents to move. Coincidentally, we happened to get back to 100% for Skill C as well, since all of the multi-skilled A-C agents were moved away from Skill A to Skill C. We are now only offering uptime for Skill B. What this example demonstrated was that when we increased the forecast for skill B by 300, we were able to get an additional 200 agents, even though none of the new agents could work Skill B. This was a particularly unfriendly example since all of the additional agents were single skilled, working the same skill. With a more random distribution of new agents we would be able to accept agents working any of the three skills right up to the last agent. Also worth noting in this example was that after the change to the forecast, all of the actions of the system were automatic. The reallocation happened automatically. The uptime offers were generated automatically as well. No intervention by the staff was required to start increasing the work force beyond changing the forecast.

Figure 8:
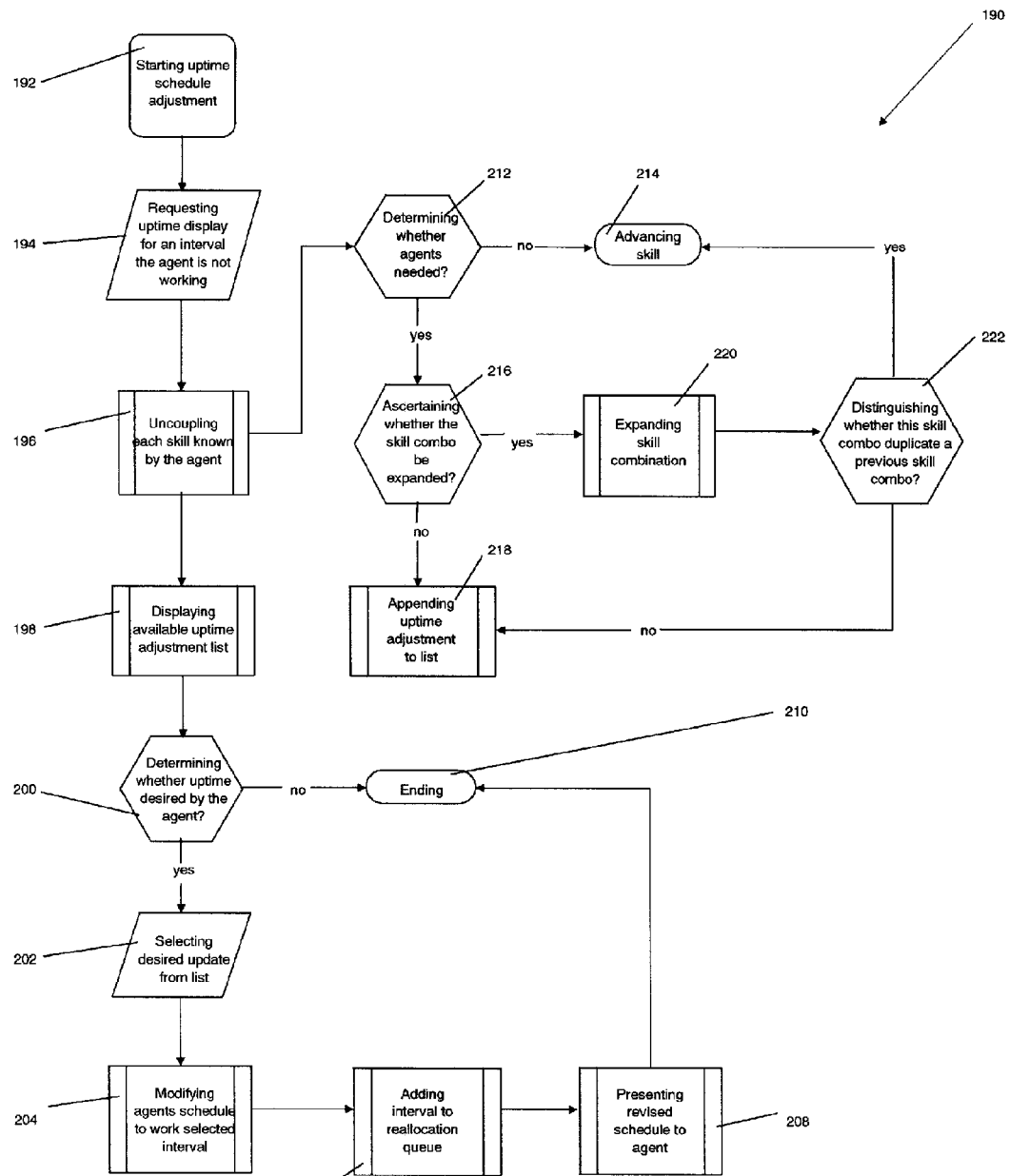
FIG. 8 depicts a block diagram of an uptime schedule adjustment.

Referring now to FIG. 8, a first software flow diagram 190 of agent uptime schedule adjustment is depicted. The computer readable medium comprises requesting 194 uptime display for and agent who is not working, querying 196 for each skill known by the agent, displaying 198 the available uptime adjustment list, querying 200 whether the uptime is desired by the agent, selecting 202 the desired update from the list, modifying 204 the agents schedule to work the selected interval, adding 206 the interval to the reallocation queue and displaying 208 the revised schedule to the agent, at which point the update has ended 210. The computer readable medium also queries 196 for each skill known by the agent, querying 212 if more agents are needed, querying 216 can the skill combination be expanded if yes and advancing 214 to the next skill if no, adding 218 uptime adjustment to the list if no and expanding 220 the skill combination if yes, querying 222 does the skill combination duplicate a previous skill combination, and if not, adding it to the list.

Figure 9:
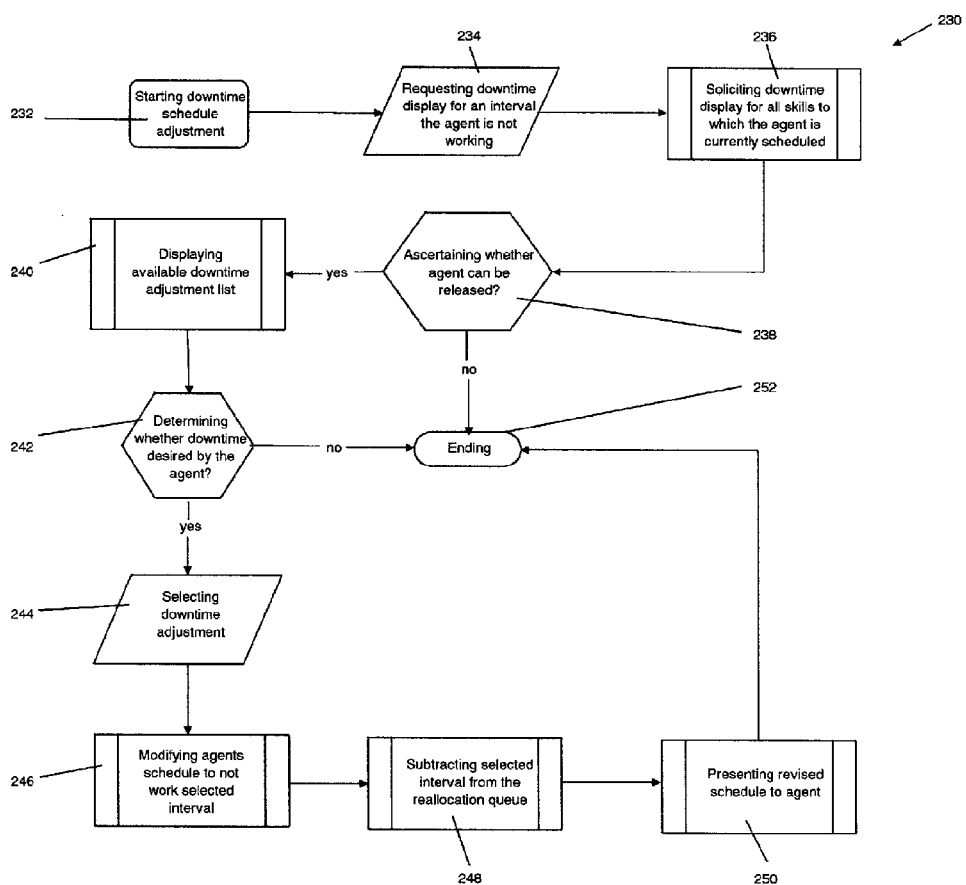
FIG. 9 depicts a block diagram of a downtime schedule adjustment.

Referring now to FIG. 9, a first software flow diagram 230 of agent downtime schedule adjustment is depicted. The computer readable medium comprises requesting 234 downtime display for an interval the agent is not working, requesting 236 downtime display for all skills for which the agent is currently scheduled, querying 238 whether the agent can be released, if no end, if yes then displaying 240 available downtime adjustment list, querying 242 if downtime is desired by the agent, if no end, if yes, selecting 244 downtime adjustment, modifying 246 the agents schedule to not work the selected interval, subtracting 248 the interval from the reallocation queue, displaying 250 the revised schedule to the agent and ending 252.

Figure 10:
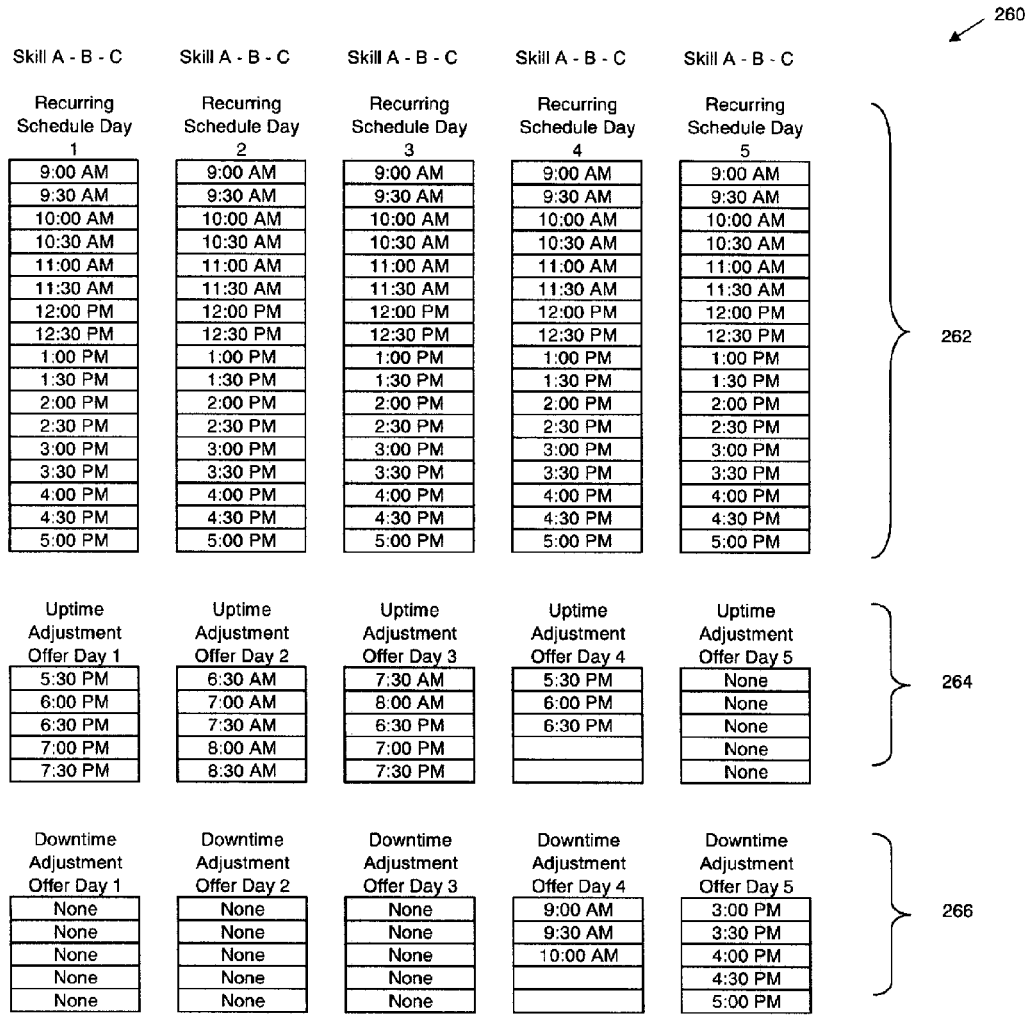
FIG. 10 depicts an exemplary recurring schedule, uptime adjustment and downtime adjustment.

Referring now to FIG. 10, showing a recurring schedule, uptime adjustment offers and downtime adjustment offers of agent 260. The recurring schedule is shown as 262 and is the required schedule, the uptime adjustment offer 264 and the downtime adjustment offer 266 are shown for that week.

Figure 11:
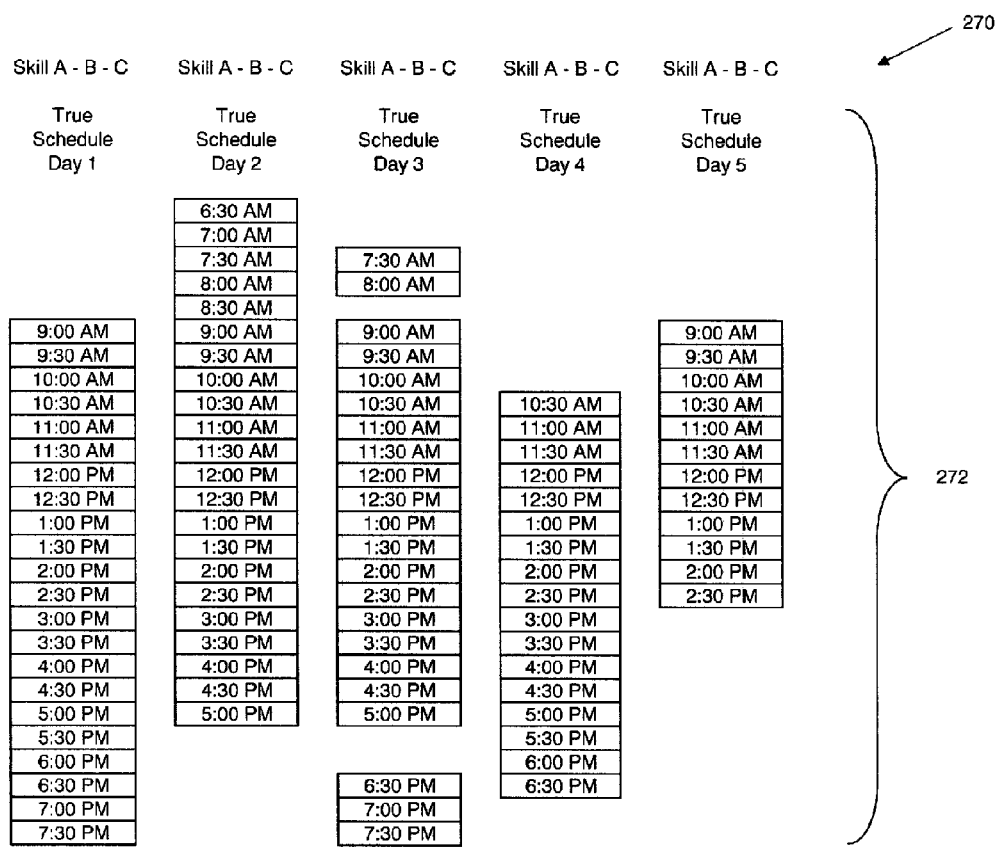
FIG. 11 depicts an exemplary modified work schedule.

Assuming that all offers in FIG. 10 were accepted by the agent, FIG. 11 shows the true schedule 270 after adjustments. The updated schedule 272 is shown for that week. Notice that not all intervals must be contiguous with the recurring schedule. Note also that some days intervals were both added and removed. There is, of course, no requirement that all offers be accepted. The agent was free to choose any of the offered intervals independent of the others.

Figure 12:
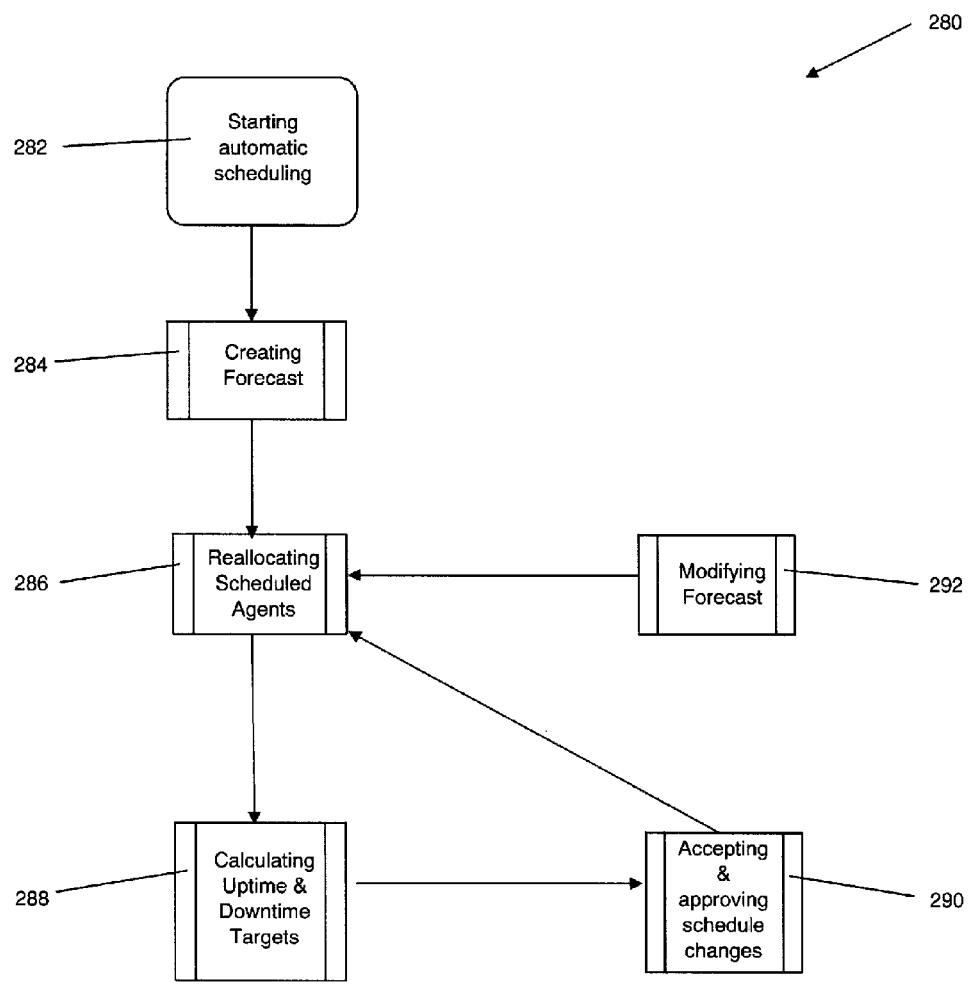
FIG. 12 depicts a block diagram of maintaining a work schedule.

Referring now to FIG. 12, shows automated scheduling 280 in accordance with the preferred embodiment of the invention. The computer readable medium comprises starting 282, creating a forecast 284, reallocating 286 scheduled agents, calculating 288 uptime and downtime targets, accepting and approving 290 schedule changes and modifying 292 the forecast.

Figure 13:
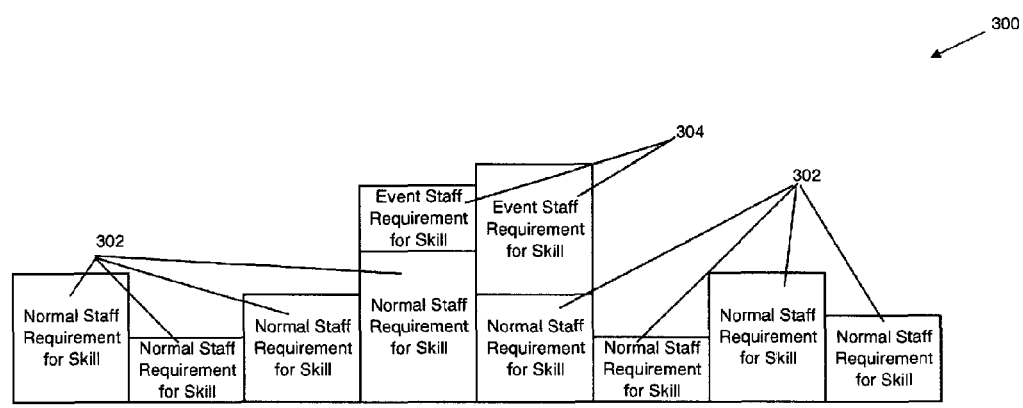
FIG. 13 depicts an exemplary event based forecast.

Referring now to FIG. 13, shows special event forecasting 300 in accordance with the preferred embodiment of the invention. The illustration shows non-event manpower forecasts 302 and event based forecasts 304. The present invention allows the capturing of advertising events for the purpose of refining forecasts. Advertising events are commercials and infomercials that can result in spikes in call volumes that typically last from 30 minutes to an hour, and never longer than three hours. Advertising events degrade forecasting accuracy in two ways. First, the spike of call volume will not be anticipated by the normal forecasting process, since these events do not always occur on the same day-of-week and/or time-of-day. Forecasting volume base on past experience will not anticipate the spike and may result in understaffing. Second, the spike caused by the event will skew the historical data. The historical data will be less accurate and, to the extent we base our forecast on the historical data, the forecast will be degraded by the effect of past advertising events. The present invention includes a tracking system to store the effects of advertising events. This history is then used to adjust historical call volumes for the effect of the advertising event. This results in more accurate analysis of the underlying call volume trends and more accurate forecasts. The present invention also allows future advertising events that are scheduled to be incorporated into the forecast. This permits more accurate forecasts since the impact to call volumes caused by the event can be anticipated.

Reallocation occurs periodically based upon either forecasted changes or schedule changes. The frequency of the allocation for an interval will be calculated and will depend on the system resources that are available for the task. The calculation of uptime and downtime can be done at the time each agent requests available time. Reallocation can be performed on each request, but for efficiency the calculation is done in advance. Schedule changes will be occurring constantly as agents modify their schedules by accepting uptime and downtime, and also due to other changes, which can be triggered by a schedule change. Forecasts will change less frequently than schedules, but may have a dramatic impact on the targets. When they occur, they will trigger an immediate reallocation.

Figure 14:
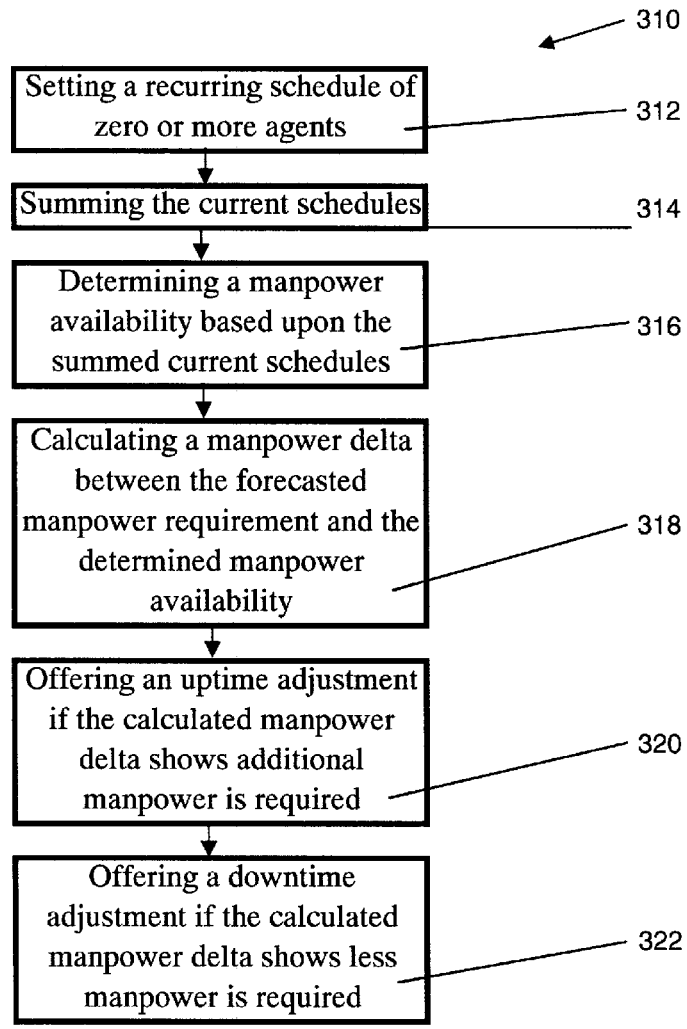
FIG. 14 depicts a first method of maintaining a work schedule in accordance with a preferred embodiment of the present invention.

Referring now to FIG. 14, shows a first method for maintaining a work schedule 310 in accordance with the preferred embodiment of the invention. A net manpower requirement is determined for at least one interval of time that comprises setting 312 a recurring schedule for zero or more agents, summing 314 the current schedules, determining 316 a manpower availability based upon the summed current schedules, calculating 318 a manpower delta between the forecasted manpower requirement and the determined manpower availability, offering 320 an uptime adjustment if the calculated manpower delta shows additional manpower is required, and offering 322 a downtime adjustment if the calculated manpower delta shows less manpower is required. The method is performed by software, hardware, firmware, and/or the combination of software, hardware, and/or firmware.

Figure 15:
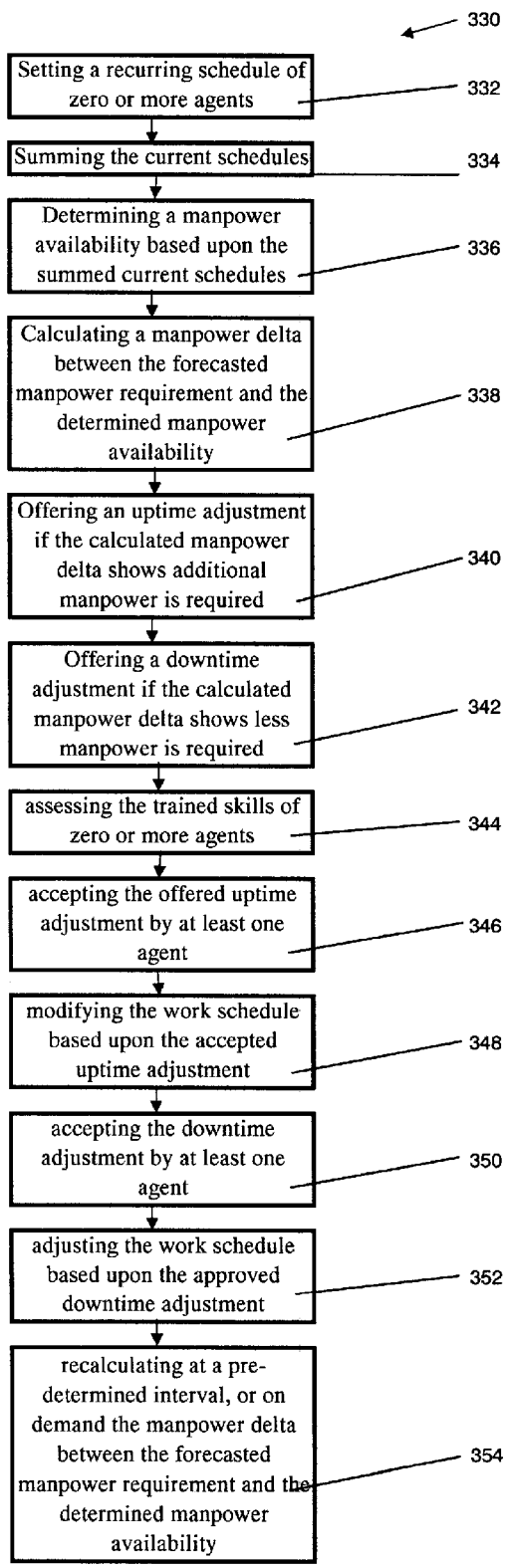
FIG. 15 depicts a second method of maintaining a work schedule in accordance with a preferred embodiment of the present invention.

Referring now to FIG. 15, shows a second method for maintaining a work schedule 330 in accordance with the preferred embodiment of the invention. Wherein a net manpower requirement is determined for at least one interval of time, that comprises setting 332 a recurring schedule for zero or more agents, summing 334 the current schedules, determining 336 a manpower availability based upon the summed current schedules, calculating 338 a manpower delta between the forecasted manpower requirement and the determined manpower availability, offering 340 an uptime adjustment if the calculated manpower delta shows additional manpower is required, and offering 342 a downtime adjustment if the calculated manpower delta shows less manpower is required. Wherein the method of forecasting manpower requirement is for each skill, wherein the determination of manpower availability is based upon assigned skills, wherein the summing of current schedules of each agent is based upon assigned skills, the determination of manpower availability is based upon scheduled skills, the calculation of manpower delta is based upon scheduled skills, the offer of uptime adjustment is based upon trained skills and the proposal of downtime adjustment is based upon assigned skills. The method may also comprise assessing 344 the trained skills of zero or more agents, accepting 346 the offered uptime adjustment by zero or more agents, modifying 348 the work schedule based upon the accepted uptime adjustment, approving 350 the downtime adjustment by zero or more agents, adjusting 352 the work schedule based upon the approved downtime adjustment and recalculating 354 at a pre-determined interval, or on demand, the manpower delta between the forecasted manpower requirement and the determined manpower availability. The method is performed by software, hardware, firmware, and/or the combination of software, hardware, and/or firmware.

Figure 16:
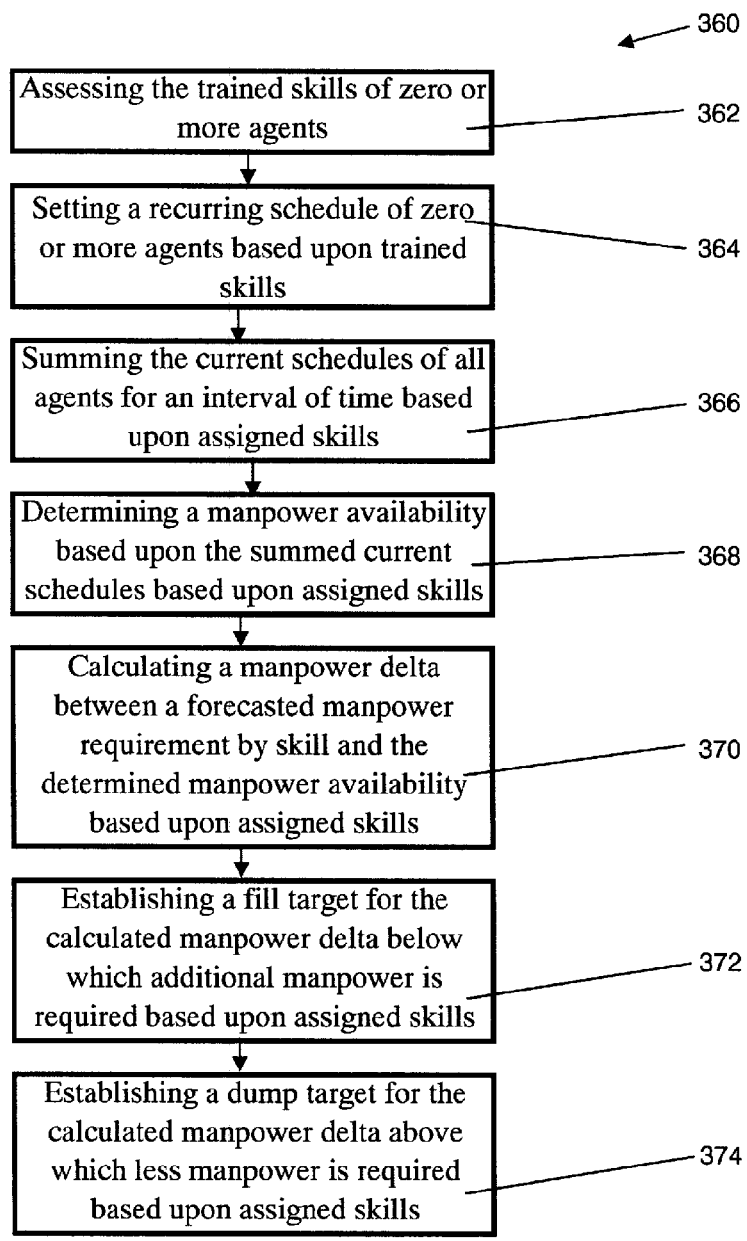
FIG. 16 depicts a first software flow block of maintaining a work schedule in accordance with a preferred embodiment of the present invention.

Referring now to FIG. 16, shows a first software flow block for maintaining a work schedule 360 accordance with the preferred embodiment of the invention. A computer readable medium that comprises instructions for assessing 362 the trained skills of zero or more agents, setting 364 a recurring schedule of zero or more agents based upon trained skills, summing 366 the current schedules of all agents for an interval of time based upon assigned skills, determining 368 a manpower availability based upon the summed current schedules based upon assigned skills, calculating 370 a manpower delta between a forecasted manpower requirement by skill and the determined manpower availability based upon assigned skills, establishing 372 a fill target for the calculated manpower delta below which additional manpower is required based upon assigned skills, and establishing 374 a dump target for the calculated manpower delta above which less manpower is required based upon assigned skills. The transfer of information between the processor and the memory occurs via at least one of a wireless protocol, a wired protocol and the combination of a wireless protocol and a wired protocol. These steps are performed by software but in other embodiments, may be performed by hardware, firmware, and/or the combination of software, hardware, and/or firmware without departing from the scope of the present invention.

Figure 21:
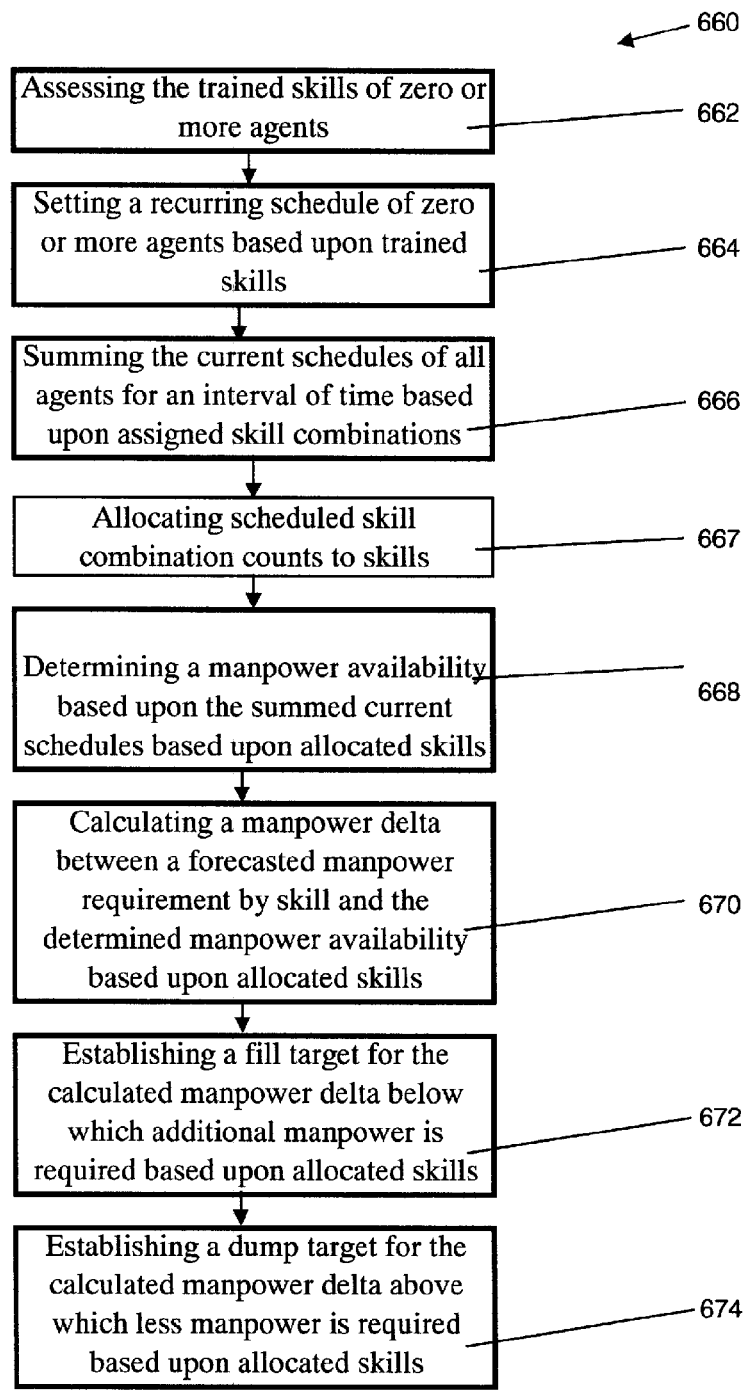
FIG. 21 depicts a third software flow block of maintaining a work schedule in accordance with a preferred embodiment of the present invention.

Referring now to FIG. 21, shows a second software flow block for maintaining a work schedule 660 accordance with the preferred embodiment of the invention. A computer readable medium that comprises instructions for assessing 662 the trained skills of zero or more agents, setting 664 a recurring schedule of zero or more agents based upon trained skills, summing 666 the current schedules of all agents for an interval of time based upon assigned skill combinations, allocating 667 the summed current schedules for each skill combination to skills, determining 668 a manpower availability based upon the summed current schedules based upon allocated skills, calculating 670 a manpower delta between a forecasted manpower requirement by skill and the determined manpower availability based upon allocated skills, establishing 672 a fill target for the calculated manpower delta below which additional manpower is required based upon allocated skills, and establishing 674 a dump target for the calculated manpower delta above which less manpower is required based upon allocated skills. The transfer of information between the processor and the memory occurs via at least one of a wireless protocol, a wired protocol and the combination of a wireless protocol and a wired protocol. These steps are performed by software but in other embodiments, may be performed by hardware, firmware, and/or the combination of software, hardware, and/or firmware without departing from the scope of the present invention.

Figure 17:
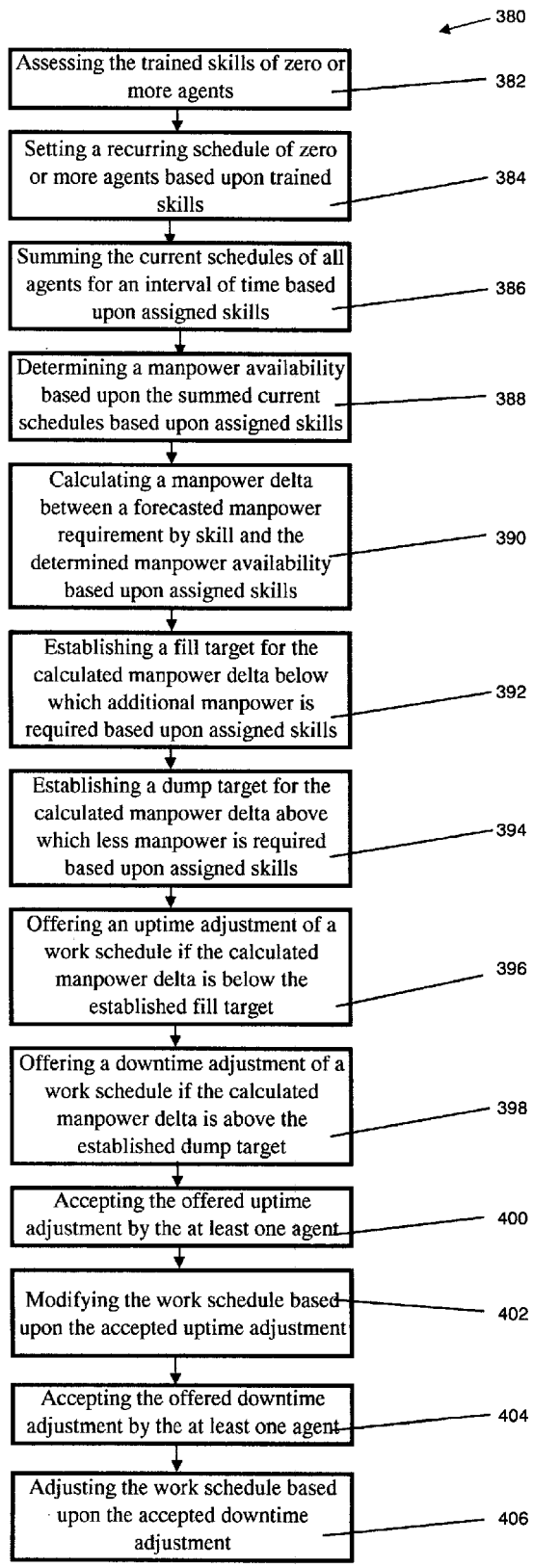
FIG. 17 depicts a second software flow block of maintaining a work schedule in accordance with a preferred embodiment of the present invention.

Referring now to FIG. 17, shows a third software flow block for maintaining a work schedule 380 accordance with the preferred embodiment of the invention. A computer readable medium that comprises instructions for assessing 382 the trained skills of zero or more agents, setting 384 a recurring schedule of zero or more agents based upon trained skills, summing 386 the current schedules of all agents for an interval of time based upon assigned skills, determining 388 a manpower availability based upon the summed current schedules based upon assigned skills, calculating 390 a manpower delta between a forecasted manpower requirement by skill and the determined manpower availability based upon assigned skills, establishing 392 a fill target for the calculated manpower delta below which additional manpower is required based upon assigned skills, and establishing 394 a dump target for the calculated manpower delta above which less manpower is required based upon assigned skills. The instructions may also comprise offering 396 an uptime adjustment of a work schedule if the calculated manpower delta is below the established fill target, offering 398 a downtime adjustment of a work schedule if the calculated manpower delta is above the established dump target, accepting 400 the offered uptime adjustment by zero or more agents, modifying 402 the work schedule based upon the accepted uptime adjustment, approving 404 the offered downtime adjustment by zero or more agents and adjusting 406 the work schedule based upon the accepted downtime adjustment. The transfer of information between the processor and the memory occurs via at least one of a wireless protocol, a wired protocol and the combination of a wireless protocol and a wired protocol. These steps are performed by software but in other embodiments, may be performed by hardware, firmware, and/or the combination of software, hardware, and/or firmware without departing from the scope of the present invention.

Figure 22:
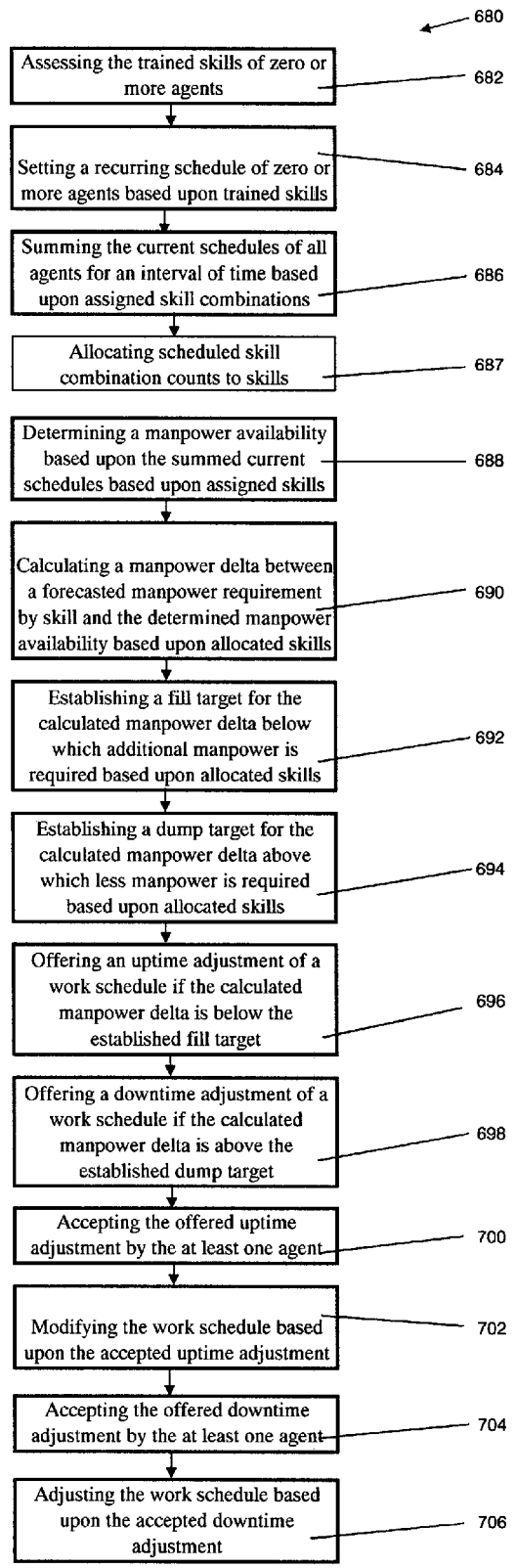
FIG. 22 depicts a forth software flow block of maintaining a work schedule in accordance with a preferred embodiment of the present invention.

Referring now to FIG. 22, shows a fourth software flow block for maintaining a work schedule 680 accordance with the preferred embodiment of the invention. A computer readable medium that comprises instructions for assessing 682 the trained skills of zero or more agents, setting 684 a recurring schedule of zero or more agents based upon trained skills, summing 686 the current schedules of all agents for an interval of time based upon assigned skill combinations, allocating 667 the summed current schedules for each skill combination to skills, determining 688 a manpower availability based upon the summed current schedules based upon allocated skills, calculating 690 a manpower delta between a forecasted manpower requirement by skill and the determined manpower availability based upon allocated skills, establishing 692 a fill target for the calculated manpower delta below which additional manpower is required based upon allocated skills, and establishing 694 a dump target for the calculated manpower delta above which less manpower is required based upon allocated skills. The instructions may also comprise offering 696 an uptime adjustment of a work schedule if the calculated manpower delta is below the established fill target, offering 698 a downtime adjustment of a work schedule if the calculated manpower delta is above the established dump target, accepting 700 the offered uptime adjustment by zero or more agents, modifying 702 the work schedule based upon the accepted uptime adjustment, approving 704 the offered downtime adjustment by zero or more agents and adjusting 706 the work schedule based upon the accepted downtime adjustment. The transfer of information between the processor and the memory occurs via at least one of a wireless protocol, a wired protocol and the combination of a wireless protocol and a wired protocol. These steps are performed by software but in other embodiments, may be performed by hardware, firmware, and/or the combination of software, hardware, and/or firmware without departing from the scope of the present invention.

Figure 18:
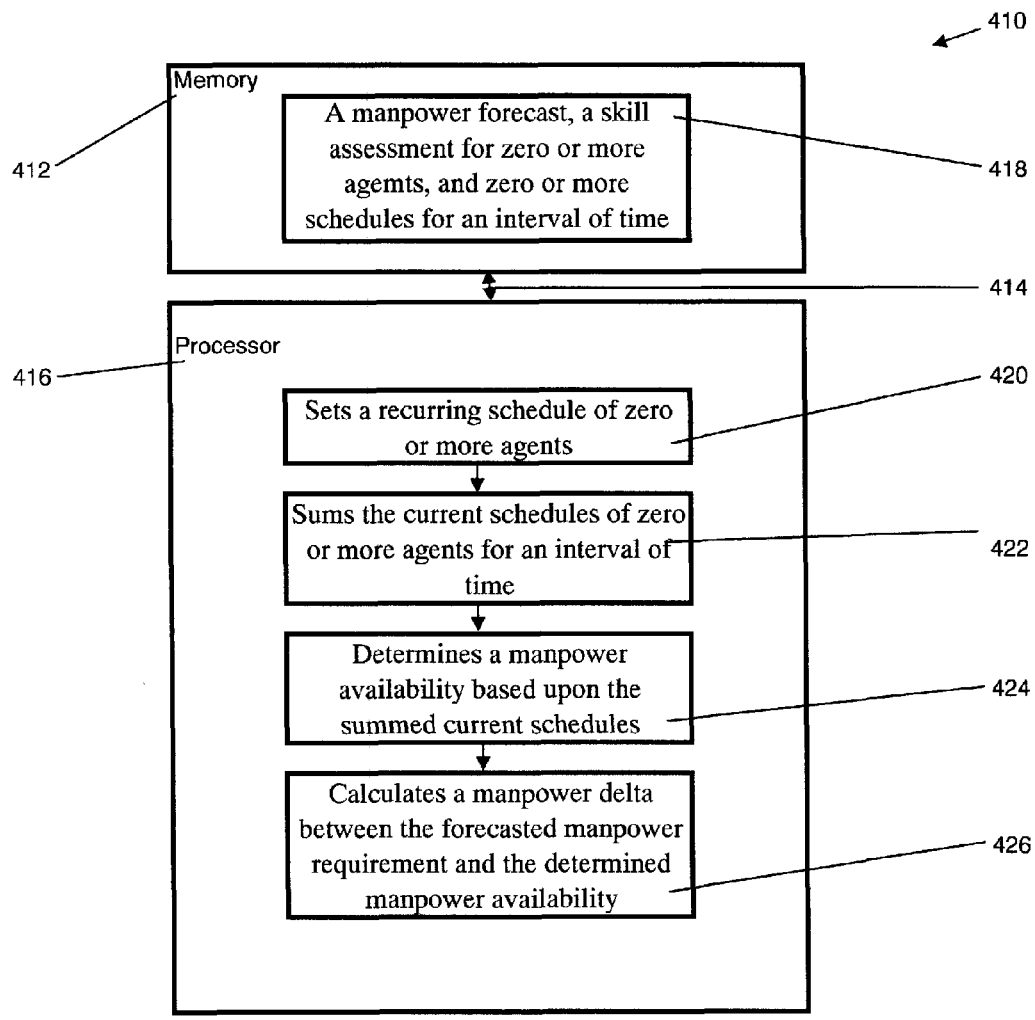
FIG. 18 depicts a first system for maintaining a work schedule in accordance with a preferred embodiment of the present invention.

Referring now to FIG. 18, shows a first system for maintaining a work schedule 410 in accordance with the preferred embodiment of the invention. A system for maintaining a work schedule, that comprises, a memory 412 that receives 418 at least one manpower forecast, a skill assessment for zero or more agents, zero or more schedules for an interval of time, and a processor 416 communicably coupled 414 to the memory, wherein the processor, sets 420 a recurring schedule of zero or more agents, sums 422 the current schedules of the zero or more agents for an interval of time, determines 424 a manpower availability based upon the summed current schedules, and calculates 426 a manpower delta between the forecasted manpower requirement and the determined manpower availability. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Figure 19:
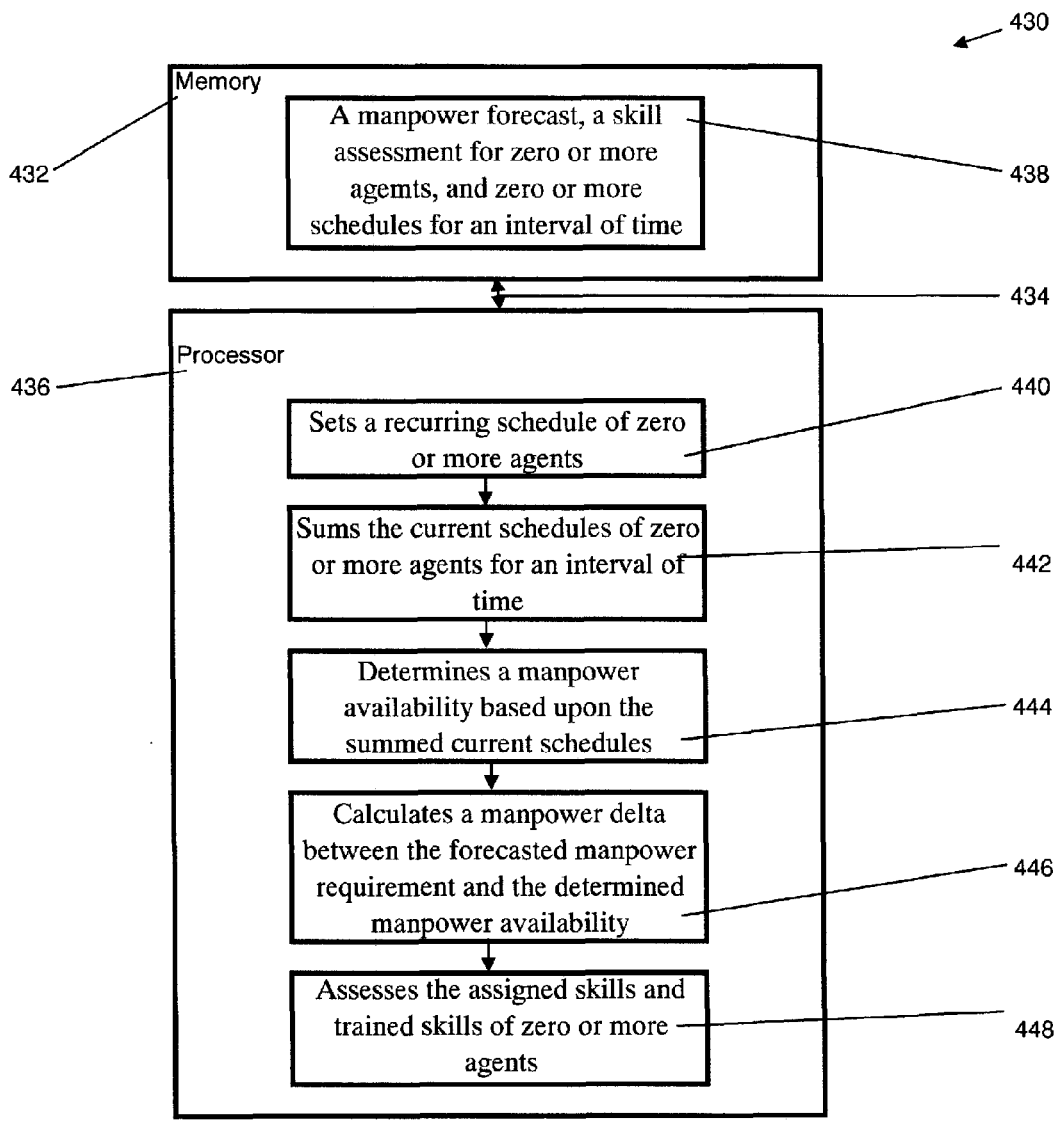
FIG. 19 depicts a second system for maintaining a work schedule in accordance with a preferred embodiment of the present invention.
Figure 23:
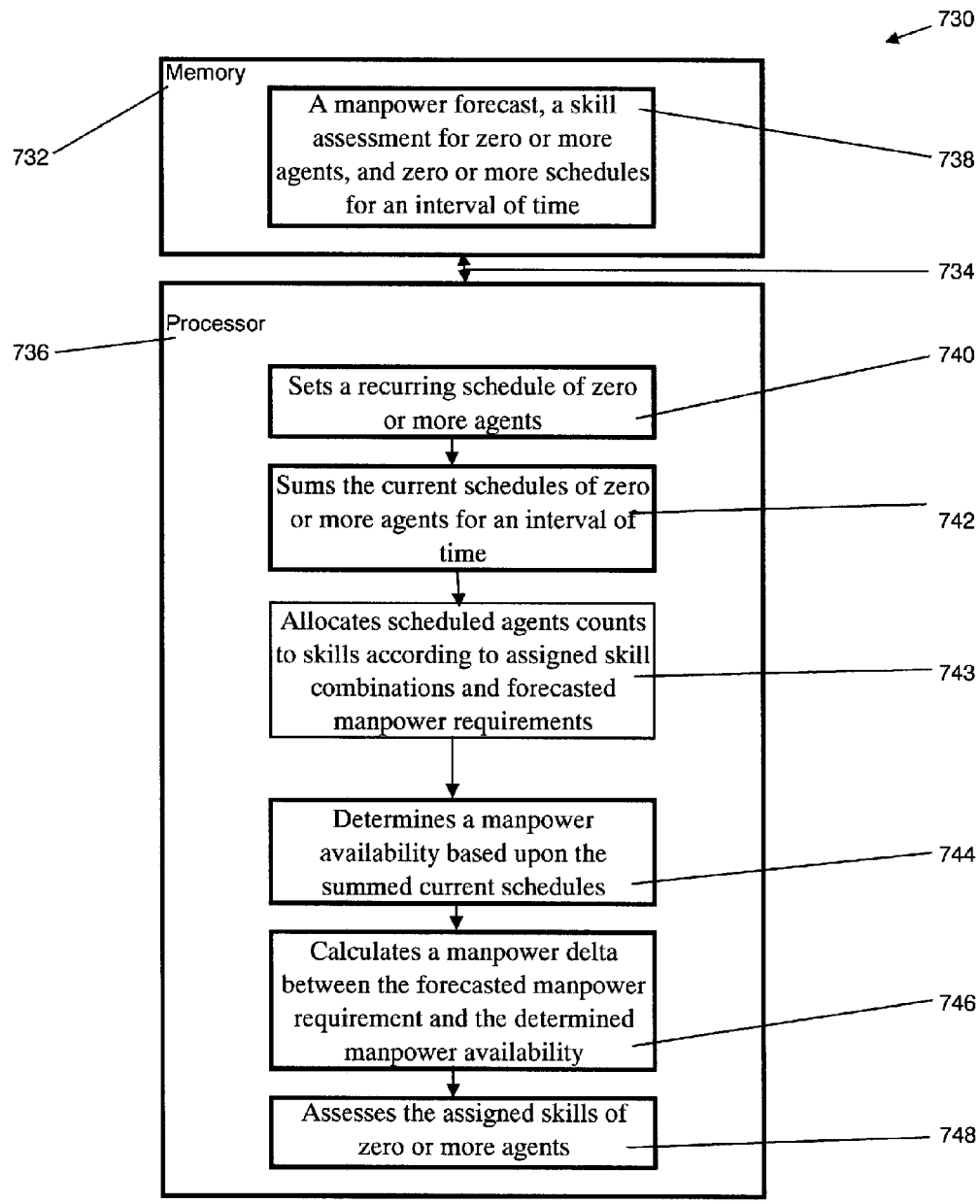
FIG. 23 depicts a third system for maintaining a work schedule in accordance with a preferred embodiment of the present invention.

Referring now to FIG. 19, shows a second system for maintaining a work schedule 430 accordance with the preferred embodiment of the invention. A system for maintaining a work schedule, that comprises, a memory 432 that receives 438 at least one manpower forecast, a skill assessment for zero or more agents, zero or more schedules for an interval of time, and a processor 436 communicably coupled 434 to the memory, wherein the processor, sets 440 a recurring schedule of zero or more agents, sums 442 the current schedules of the zero or more agents for an interval of time, determines 444 a manpower availability based upon the summed current schedules, and calculates 446 a manpower delta between the forecasted manpower requirement and the determined manpower availability and wherein the processor assesses the assigned skills of zero or more agents. The system processor may also assess 448 the assigned skills and the trained skills of zero or more agents. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware Referring now to FIG. 23, shows a second system for maintaining a work schedule 730 accordance with the preferred embodiment of the invention. A system for maintaining a work schedule, that comprises, a memory 732 that receives 738 at least one manpower forecast, a skill assessment for zero or more agents, zero or more schedules for an interval of time, and a processor 736 communicably coupled 734 to the memory, wherein the processor, sets 740 a recurring schedule of zero or more agents, sums 742 the current schedules of the zero or more agents for an interval of time, allocates 743 scheduled agent counts to skills according to assigned skill combinations and forecasted manpower requirements, determines 744 a manpower availability based upon the summed current schedules, and calculates 746 a manpower delta between the forecasted manpower requirement and the determined manpower availability and wherein the processor assesses the assigned skills of zero or more agents. The system processor may also assess 748 the trained skills of zero or more agents. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware In short, this embodiment of the invention may reside either on a medium directly addressable by the computers processor (main memory, however implemented) or on a medium indirectly accessible to the processor (secondary storage media such as hard disk drives, tape drives, CD-ROM drives, floppy drives, or the like). Consistent with the above teaching, the program storage device can be affixed either permanently or removably to a bay, socket, connector, or other hardware provided by the cabinet, motherboard, or other component of a given computer system.

Those skilled in the art, when reading this description, will understand that unless expressly stated to the contrary, the use of the singular or the plural number herein is illustrative, rather than limiting, of the instant invention. Accordingly, where a given term is discussed in the singular number, it will be well understood that the invention also contemplates a plural number of the item corresponding to the given term and vice versa, unless expressly stated herein to the contrary.

Those skilled in the art will further recognize that for the purposes of convenience, legibility, and clarity, various data stores or databases are illustrated herein as separate entities, and are discussed separately. However, as to these data stores in particular, the embodiments shown herein are illustrative rather than limiting, and that some or all of these various data stores could readily be combined or consolidated into one or more data stores or databases without departing from the scope of the invention.

The term data store herein refers to any storage medium capable of storing data, whether realized using semiconductor, magnetic, or optical technology. This term can also include abstract data structures supported by any number of programming languages, with non-limiting examples including queues, stacks, linked lists or the like, all of which are implemented at the machine level by disk storage, semiconductor memory, optical media, or the like. If a given data store is implemented as a database, this database can take the form of a relational database, an object-oriented database, and any combination thereof, or any other known database technology.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims. While particular embodiments and examples of the present invention have been described above, it should be understood that they have been presented by way of example only and not as limitations. Those of ordinary skill in the art will readily appreciate that other various embodiments or configurations adopting the principles of the subject invention are possible. The breadth and scope of the present invention is defined by the following claims and their equivalents, and is not limited by the particular embodiments described herein.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the kiosks, loop interface remote terminal ends, access management system or internet protocol devices. Also, these capabilities may be performed in the current manner or in a distributed manner and on, or via, any device able to provide and/or receive broadband signals. Further, although depicted in a particular manner, various modules or blocks may be repositioned without departing from the scope of the current invention. For example, the functionality performed by the loop interface remote terminal end can be self-contained. Still further, although depicted in a particular manner, a greater or lesser number kiosks, DSL transceivers, residential gateways, DC terminations and internet protocol devices can be utilized with the present invention in order to accomplish the present invention, to provide additional known features to the present invention, and/or to make the present invention more efficient.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the processors. Also, these capabilities may be performed in the current manner or in a distributed manner and on, or via, any device able to provide, send and/or receive lookup data. Further, although depicted in a particular manner, various modules or blocks may be repositioned without departing from the scope of the current invention. For example, the functionality performed by the processor and memory can be self-contained. Still further, although depicted and/or described in a particular manner, a greater or lesser number or processors and memories can be utilized with the present invention in order to accomplish the present invention, to provide additional known features to the present invention, and/or to make the present invention more efficient. Also, communication between such modules or blocks can occur via a cellular phone, a computer with external wireless capability (such as a wireless card) or internal wireless capability (such as 802.11 or any of the other 802 variants), an Internet Protocol enabled phone, and/or any device that is able to send and receive information.

What is claimed is:

1. A method for maintaining a work schedule, comprising:
accepting a forecasted manpower requirement for zero or more agents at a memory;
setting, via a processor, a recurring schedule for zero or more agents;
summing the number of agents currently scheduled for an interval of time based on assigned skills of each agent and current schedules of agents who are scheduled to work multiple skills concurrently by a combination of skills to which they are scheduled;
determining a manpower availability based on scheduled skills of each agent and based on an allocated skill of each agent;
calculating a manpower delta between the forecasted manpower requirement by skill and the determined manpower availability, the calculated manpower delta based on the scheduled skills of each agent;
recalculating at a pre-determined interval, or on demand, the manpower delta between the forecasted manpower requirement and the determined manpower availability;
offering an uptime adjustment to an agent not currently scheduled when the calculated manpower delta shows additional manpower is required, wherein the uptime adjustment offer is based on trained skills of the agent and when the uptime adjustment offer is desired by the agent; and
offering a downtime adjustment to an agent currently scheduled when the calculated manpower delta shows less manpower is required, wherein the downtime adjustment offer is based on assigned skills of the agent and when the downtime adjustment offer is desired by the agent.

2. The method of claim 1, wherein the forecasting of the manpower requirement is for at least one of one skill and two or more skills.

3. The method of claim 1, further comprising assessing a scheduled skill and a trained skill of zero or more agents.

4. The method of claim 3, wherein the setting of recurring schedules of each agent is based upon current scheduled skills 5. The method of claim 3, wherein the determination of manpower availability is based upon the scheduled skills.

6. The method of claim 3, wherein the calculation of manpower delta is based upon the scheduled skills.

7. The method of claim 3, wherein the offer of an uptime adjustment is based upon the trained skills.

8. The method of claim 3, wherein the offer of a downtime adjustment is based upon the scheduled skills.

9. The method of claim 1, further comprising:
accepting the offered uptime adjustment by at least one agent.

10. The method of claim 9, further comprising:
modifying the work schedule based upon the accepted uptime adjustment.

11. The method of claim 1, further comprising:
accepting the downtime adjustment by at least one agent.

12. The method of claim 11, further comprising:
adjusting the work schedule based upon the accepted downtime adjustment.

13. The method of claim 1, further comprising:
allocating a scheduled skill combination count to a component skill.

14. A non-transitory computer readable medium comprising instructions that, when executed by a processor, are configured to cause the processor to:
assess a trained skill and a scheduled skill of zero or more agents;
set a recurring schedule of zero or more agents based upon the trained skills;
sum a current schedule of all agents for an interval of time based on assigned skills of each agent;
determine a manpower availability based scheduled skill of each agent;
calculate a manpower delta between a forecasted manpower requirement by skill and the determined manpower availability, wherein the calculated manpower delta is based on the scheduled skills of each agent;
recalculate at a pre-determined interval, or on demand, the manpower delta between the forecasted manpower requirement and the determined manpower availability;
establish a fill target for the calculated manpower delta below which additional manpower is required based upon the scheduled skills;
establish a dump target for the calculated manpower delta above which less manpower is required based upon the scheduled skills; and
offer an uptime adjustment to an agent not currently scheduled when the calculated manpower delta shows additional manpower is required, wherein the uptime adjustment offer is based on trained skills of the agent and when the uptime adjustment offer is desired by the agent; and
offer a downtime adjustment to an agent currently scheduled when the calculated manpower delta shows less manpower is required, wherein the downtime adjustment offer is based on assigned skills of the agent and when the downtime adjustment offer is desired by the agent.

15. The non-transitory computer readable medium of claim 14, wherein the instructions are further configured to cause the processor to:
- offer an uptime adjustment of a work schedule to an agent who is currently not scheduled if the calculated manpower delta is below an affixed fill target based upon the trained skills; and
- offer a downtime adjustment of the work schedule to an agent who is currently scheduled if the calculated manpower delta is above the established dump target based upon the scheduled skills 16. The computer readable medium of claim 15, wherein the instructions are further configured to cause the at least one processor to:
- accept the offered uptime adjustment by at least one agent; and
- modify the work schedule based upon the accepted uptime adjustment.

17. The computer readable medium of claim 15, wherein the instructions are further configured to cause the at least one processor to:
- accept the offered downtime adjustment by at least one agent;
- adjust the work schedule based upon the accepted downtime adjustment.

18. The computer readable medium of claim 15, wherein the instructions are further configured to cause the at least one processor to:
- allocate a scheduled skill combination count to a component skill.

19. A system for maintaining a work schedule, comprising:
- a memory configured to receive at least one manpower forecast requirement, a skill assessment for zero or more agents, and zero or more work schedules for an interval of time; and
  - a processor communicably coupled to the memory, wherein the processor is configured to:
    - set a recurring schedule of zero or more agents;
    - sum a current schedule of the zero or more agents for the interval of time based on assigned skills of each agent and current schedules of agents who are scheduled to work multiple skills concurrently by a combination of skills to which they are scheduled;
    - determine a manpower availability based upon the summed current schedules;
    - determine a manpower availability based on scheduled skill of each agent;
    - calculate a manpower delta between the forecasted manpower requirement by skill and the determined manpower availability, wherein the calculated manpower delta is based on the scheduled skills of each agent;
    - recalculate at a pre-determined interval, or on demand, the manpower delta between the forecasted manpower requirement and the determined manpower availability;
    - offer an uptime adjustment to an agent not currently scheduled when the calculated manpower delta shows additional manpower is required, wherein the uptime adjustment offer is based on trained skills of the agent and when the uptime adjustment offer is desired by the agent; and
    - offer a downtime adjustment to an agent currently scheduled when the calculated manpower delta shows less manpower is required, wherein the downtime adjustment offer is based on assigned skills of the agent and when the downtime adjustment offer is desired by the agent.

20. The system of claim 19, wherein the processor is further configured to assess a trained skill and a scheduled skill of the at least one agent.

21. The system of claim 19 wherein the processor is further configured to:
- allocate a skill combination count across the skills.

* * * * *